US012462128B1

(12) United States Patent
Kim

(10) Patent No.: US 12,462,128 B1
(45) Date of Patent: Nov. 4, 2025

(54) IDENTIFICATION CARD AUTHENTICATION SYSTEM

(71) Applicant: OO7ID, San Diego, CA (US)

(72) Inventor: Hak Soo Kim, San Diego, CA (US)

(73) Assignee: OO7ID, San Diego, CA (US)

( * ) Notice: Subject to any disclaimer, the term of this patent is extended or adjusted under 35 U.S.C. 154(b) by 0 days.

(21) Appl. No.: 19/011,334

(22) Filed: Jan. 6, 2025

Related U.S. Application Data

(60) Provisional application No. 63/694,586, filed on Sep. 13, 2024, provisional application No. 63/690,111, filed on Sep. 3, 2024.

(51) Int. Cl.
*G06K 7/14* (2006.01)
*G06K 7/10* (2006.01)
*G06K 7/12* (2006.01)

(52) U.S. Cl.
CPC .............. *G06K 7/143* (2013.01); *G06K 7/12* (2013.01); *G06K 7/10297* (2013.01)

(58) Field of Classification Search
CPC ....... G06K 7/143; G06K 7/12; G06K 7/10297
See application file for complete search history.

(56) References Cited

U.S. PATENT DOCUMENTS

2004/0112962 A1* 6/2004 Farrall ............... G08B 13/2442
235/462.01

\* cited by examiner

*Primary Examiner* — Matthew Mikels
(74) *Attorney, Agent, or Firm* — Knobbe, Martens, Olson & Bear, LLP

(57) ABSTRACT

This application relates to an identification card authentication system and methods for authenticating the identification card. The identification card authentication system includes an identification card insert slot to insert the identification card, a roller to detect the insertion of the identification card, a height detector to detect the height of the identification card, a full mark detector to detect a security mark printed on a surface of the identification card, an embossed mark detector to detect an embossed mark printed on the identification card, and a controller (e.g., included in a computing device) to store embedded security features associated with the identification card and authenticate the detected heigh, full mark, and embossed mark of the identification card by comparing them with the respective security feature from the embedded security features.

19 Claims, 18 Drawing Sheets

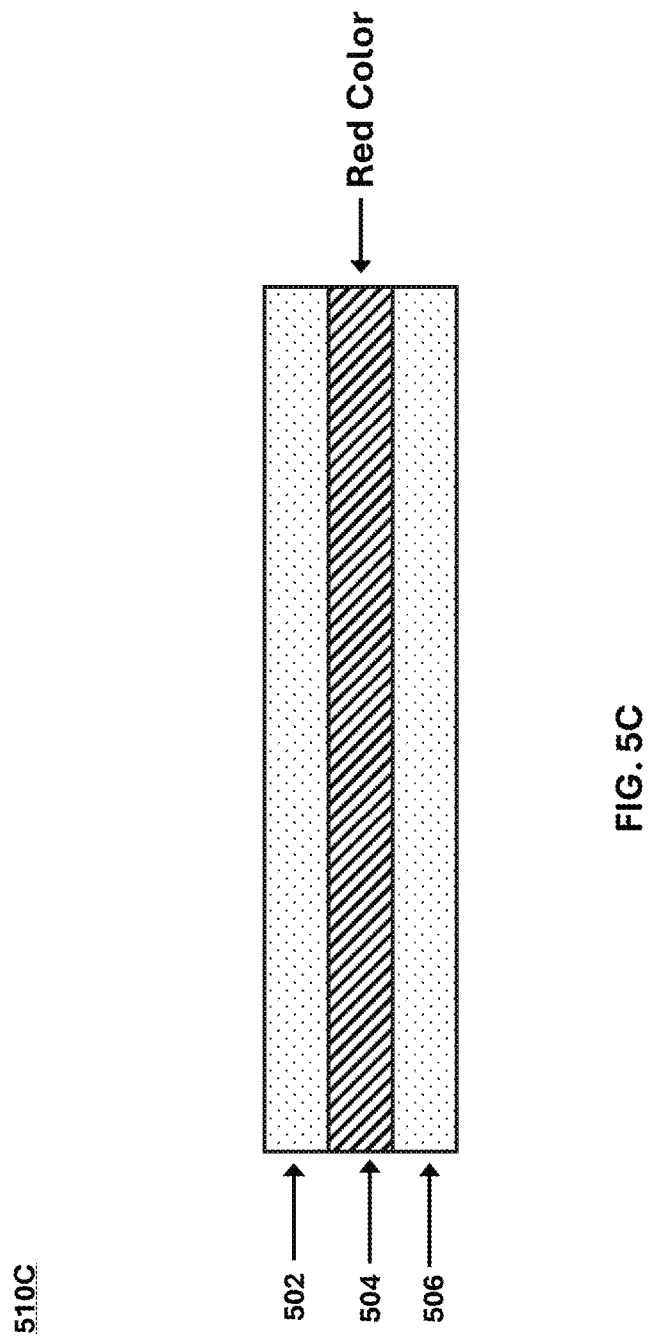

IDENTIFICATION CARD AUTHENTICATION SYSTEM

This application claims the benefit of U.S. Provisional Patent Applications Nos. 63/690,111, titled "IDENTITY CARD INSPECTION DEVICES AND METHODS" filed on Sep. 3, 2024, and 63/694,586, titled "HYBRID IDENTIFICATION AUTHENTICATION SYSTEMS AND METHOD" filed on Sep. 13, 2024, the entire contents of each of which are hereby incorporated by reference in their entireties.

BACKGROUND

Technical Field

The described technology generally relates to an identification card authentication system and in particular, to an identification card authentication system and method for authenticating an identification card.

Description of Related Technology

An identification card serves as a widely adopted means for establishing an individual's identity by including pertinent information such as biographical data (e.g., name, date of birth, address, or other personal identifiers). Such identification cards can include physical cards, such as driver's licenses, national identification cards, passports, and the like. These cards often include an individual's identity information embedded as textual details, photographs, barcodes, magnetic strips, or integrated chips. To ensure the authenticity of the information contained within these identification cards, a system and method for authentication is needed. This authentication process can verify that the card belongs to the claimed individual and that the data has not been tampered with or falsified.

SUMMARY

The embodiments disclosed herein each have several aspects, no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices, and methods for processing items in a distribution network.

Any of the features of an aspect is applicable to all aspects identified herein. Moreover, any of the features of an aspect is independently combinable, partly, or wholly with other aspects described herein in any way, e.g., one, two, or three or more aspects may be combinable in whole or in part. Further, any of the features of an aspect may be made optional to other aspects. Any aspect of a method can comprise another aspect of an identification card authentication system. Furthermore, any aspect of an identification card authentication system can be configured to perform a method of another aspect. Furthermore, any aspect of a method can comprise another aspect of an identification card authentication system. Moreover, any aspect of an identification card authentication system can be configured to perform a method of another aspect.

One aspect is a device for detecting security features embedded in an identification card, where the identification card includes a top layer, a bottom layer, and one or more intermediate layers positioned vertically between the top layer and the bottom layer, and the device includes an identification card insert slot configured to receive the identification card; a height detector positioned to face a first side surface of the identification card in response to the identification card being inserted into the identification card insert slot and detect a height of the identification card at the first side surface of the identification card, where the first side surface of the identification card including a side of the top layer, a side of the bottom layer, and a side of the one or more intermediate layers; a full mark detector positioned to face the top layer of the identification card in response to the identification card being inserted into the identification card insert slot, where the full mark detector is configured to detect a security mark printed on the top layer of the identification card inserted into the identification card insert slot by scanning the top layer of the identification card; a first embossed mark detector positioned to face the top layer of the identification card in response to the identification card being inserted into the identification card insert slot and configured to detect a first embossed security mark on the identification card; a network interface communicatively coupled with a computing device; and a controller configured to transmit the one or more first electrical signals representing the detected first height of the identification card to the computing device via the network interface, transmit the one or more second electrical signals representing the detected full security mark of the identification card to the computing device via the network interface, and transmit the one or more third electrical signals representing the detected first embossed security mark of the identification card to the computing device via the network interface.

In the above aspect, the height detector includes a first light source configured to illuminate light to the first side surface of the identification card inserted into the identification card insert slot and receive a first reflected light reflected from the first side surface of the identification card, and a first camera configured to detect the first reflected light, convert the detected first reflected light into one or more first electrical signals representing a detected first height of the identification card at the first side surface of the identification card, and transmit the one or more first electrical signals to a controller of the device.

In the above aspect, the full mark detector includes a sensor configured to scan the top layer of the identification card, the sensor comprising one or more second cameras, where each second camera is configured to capture the security mark on the identification card inserted into the identification card slot, convert the captured the security mark into one or more second electrical signals representing a detected full security mark of the identification card, and transmit the one or more second electrical signals to the controller of the device.

In the above aspect, the first embossed mark detector includes a second light source and a third light source configured to respectively illuminate second and third lights into the first embossed security mark and receive second reflected lights reflected from a surface of the first embossed security mark, and a third camera, where the third camera is configured to detect the second reflected lights, convert the detected second reflected lights into one or more third electrical signals representing a detected first embossed security mark of the identification card, and transmit the one or more third electrical signals to the controller of the device;

In the above device, the controller is configured to cause a processor of the computing device to authenticate the identification card by comparing the one or more first electrical signals with a standard height of the identification card stored in a memory of the computing device, comparing the one or more second electrical signals with a standard security mark of the identification card stored in the memory of the computing device, and comparing the one or more third electrical signals with a standard first embossed mark of the identification card stored in the memory of the computing device.

In the above device, the device further includes a roller positioned to face and configured to contact the top layer or the bottom layer of the identification card, where the roller is configured to roll in response to the identification card insert slot receiving the identification card.

In the above device, the device further includes an encoder operatively coupled with the roller, where the encoder is configured to detect the rolling of the roller, in response to detecting the rolling of the roller, generate a synchronization signal, indicating that the identification card is inserted into the identification card insert slot, and transmit the synchronization signal to the controller. In addition, the controller is further configured to in response to receiving the synchronization signal, activate the height detector, the full mark detector, and the first embossed mark detector.

In the above device, the first camera is further configured to detect colors of each layer of the top layer, the one or more intermediate layers, and the bottom layer of the identification card.

In the above device, the sensor included in the full mark detector has a resolution of at least 300 dots per inch.

In the above device, the device further includes a second embossed mark detector positioned to face the bottom layer of the identification card and configured to detect a second embossed security mark embedded on a surface of the bottom layer of the identification card in response to the identification card being inserted into the identification card insert slot and, where the second embossed mark detector includes a fourth light source and a fifth light source configured to respectively illuminate fourth and fifth lights into the second embossed security mark and receive third reflected lights reflected from the surface of the second embossed security mark, and a fourth camera configured to detect the third reflected lights, convert the detected third reflected lights into one or more fourth electrical signals representing the detected second embossed security mark of the identification card, and transmit the one or more fourth electrical signals to the controller of the device.

In the above device, the device further includes a rechargeable battery configured to supply power to the height detector, the full mark detector, the first embossed mark detector, and the controller, where the rechargeable battery includes a receiving coil configured to receive wireless charging energy from an external wireless charger, and the external wireless charger is electromagnetically coupled with a receiving coil of the rechargeable battery and configured to wirelessly transmit the wireless charging energy to the receiving coil.

In the above device, the device further includes a partial mark detector positioned to face the bottom layer of the identification card and configured to detect a partial security mark printed on a surface of the bottom layer of the identification card in response to the identification card being inserted into the identification card insert slot, where the partial mark detector includes a sixth light source configured to illuminate light to the partial security mark included on the surface of the bottom layer of the identification card inserted into the identification card insert slot and receive a fifth reflected light reflected from the partial security mark of the identification card, and a fifth camera configured to detect the fifth reflected light, convert the detected fifth reflected light into one or more fifth electrical signals representing a detected partial security mark of the identification card, and transmit the one or more fifth electrical signals to the controller of the device.

In the above device, the second light source and the third light source are positioned to illuminate the second and the third lights, respectively, into the embossed security mark, and the second light source and the third light source are positioned at a same vertical position with a different horizontal distance from the third camera.

In the above device, the controller is further configured to simultaneously activate the height detector, the full mark detector, and the embossed mark detector to simultaneously detect the height, the full security mark, and the embossed security mark, respectively.

In the above device, the controller is further configured to sequentially activate, in any order of, the height detector, the full mark detector, and the embossed mark detector.

In the above device, the height detector is positioned to face a second side surface of the identification card, where the second side of the identification card includes the first side surface of the identification card and a raised portion on the surface of the top layer of the first side surface of the identification card, and the first light source is further configured to illuminate light to the second side surface of the identification card, and receive a sixth reflected light reflected from the second side surface of the identification card, and the camera is further configured to detect the sixth reflected light, convert the detected sixth reflected light into one or more sixth electrical signals representing a detected second height of the identification card at the second side surface of the identification card, and transmit the one or more sixth electrical signals to the controller of the device.

In the above device, at least one of the one or more third electrical signals represents a diffraction pattern of the second reflected lights.

In the above device, the one or more second cameras are further configured to detect an ultraviolet pattern included in the full security mark.

In the above device, each layer of the identification card comprises different colors from each other. Additionally, the first camera is further configured to detect a color of each layer of the identification card, convert each detected color of each layer of the identification card into one or more seventh electrical signals representing each color of each layer of the identification card, and transmit the one or more seventh electrical signals to the controller of the device.

In the above device, the first camera is further configured to block infrared light in response to detecting the first reflected light.

In the above device, the device further includes a radio frequency identification (RFID) chip reader configured to wirelessly access data encoded in an RFID chip embedded in the identification card.

In the above device, at least one of the one or more second cameras is configured to measure a color density included in a portion of the full security mark.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIG. 5C illustrates another example of number of vertical layers of security features embedded in an identification card in accordance with the present disclosure.

DETAILED DESCRIPTION

Figure 1:
FIG. 1 illustrates an example of an identification card in accordance with the present disclosure.

Provided herein are various embodiments of systems and methods for authenticating identification cards. Embodiments described herein include an identification card authentication system for providing various methods of authenticating the identification cards. For the purposes of description, the identification cards generally refer to a physical card, including an individual's biographic information, such as any combination of name, date of birth, address, and other identifiers. To confirm the legitimacy and accuracy of the data presented on the identification card, it is necessary to employ a reliable authentication system and method. For example, such an identification card authentication system verifies the card's authenticity by evaluating its embedded security features, confirming biometric indicators, and/or cross-referencing related data with authorized databases.

In these days, identification cards (for example, driver's licenses) are widely used for verifying an individual's identity, such that government agencies, financial institutions, corporations, and various other service providers use the identification cards to verify an individual's identity. However, such reliance on identification cards can cause an increase in issuing counterfeit identification cards that leads to a critical concern in our society. For example, crimes involving counterfeit identification cards can result in severe consequences to the individual and our society, including identity theft, financial fraud, and other illegal activities.

Traditionally, the related industry has developed methods to verify the authenticity of identification cards and adopted these methods in various means for authenticating the identification cards. However, such methods have technical limitations. For example, traditional identification cards embed security features, such as holograms, microtext, and raised surface elements, and counterfeit identification cards often replicate these security features. However, the conventional technology relies on two-dimensional image analysis (e.g., for authenticating the embedded security features) for authenticating these security features and cannot accurately authenticate these features. For example, the two-dimensional image analysis cannot accurately detect three-dimensional elements of the security features, such as raised surface elements.

To address these traditional technical limitations, the present disclosure provides an identification card authentication system and methods for authenticating the identification cards. The identification cards, as disclosed herein, can include any commercially available physical identification cards, such as government-issued identification cards, private organizations-issued identification cards, and the like. Such identification cards can include any combination of commercially available security features, such as holograms, microtext, raised surface elements, and the like. The present disclosure does not limit the types and numbers of these security features. As will be disclosed herein, the identification card authentication system and methods can verify whether identity information (e.g., included in the identification cards) is both genuine and tamper-resistant, thereby enhancing the overall security and trustworthiness of the identification process.

In some embodiments, the present disclosure provides an identification card authentication system for authenticating identification cards. In some examples, the identification card authentication system includes an identification card security features detecting device (hereinafter "detecting device") and a user computing device. The detecting device and the user computing device can be communicatively coupled to each other, for example, wirelessly or wiredly. For example, the detecting device can detect the security features of the identification card and transmit the detected security features to the user computing device. The user computing device can analyze the received detected security features and authenticate the detected security features. As disclosed herein, the security features can include height and number of layers of the identification card, full or partial mark (e.g., ultraviolet pattern) embedded in the identification card, and embossed mark (e.g., holograms and/or raised surfaces) embedded in the identification card. These features are provided as examples, and various commercially available security features can be embedded in the identification card, and the detector, as disclosed herein, can detect these security features. In some other embodiments, the detecting device can include one or more processors therein configured to perform the function of at least a portion of the user computing device. The detecting device can have a wireless communication functionality. In these embodiments, a separate user computing device may not be required.

In some aspects, the detecting device can include a height detector to detect the height and number of layers of the identification card. In these aspects, the height detector can capture a side image of the identification card. In some examples, the height detector can convert the detected side image into digital signals and transmit the digital signals to the user computing device. Then, the user computing device can analyze the digital signals to authenticate the height and number of layers of the identification card.

In some aspects, the height detector can include a laser beam transmitter and receiver. For example, the laser beam transmitter can transmit laser beams toward one side of the identification card. In these aspects, the laser beam receiver is positioned facing a side of the identification card, opposite from the laser beam transmitter, so that the laser beam receiver can receive the transmitted laser beam from the laser beam transmitter. In some cases, the height detector can convert the detected side image into digital signals and transmit the digital signals to the user computing device. Then, the user computing device can analyze the digital signals to authenticate the height and number of layers of the identification card.

In some aspects, the detecting device can include one or more detectors to detect various types of security marks, such as UV marks, hologram marks, and the like. For the purpose of description, the full or partial security mark, as disclosed herein, may include ultraviolet (UV) marks, optical marks, barcodes, infrared marks, and other similar features. In some examples, the embossed mark, as disclosed herein, can include hologram marks, laser-engraved marks, watermarks, and other similar features. The present disclosure does not limit the type or number of marks that can be detected or verified.

In some examples, the detecting device can include a full mark detector to detect a full mark embedded on the top surface of the identification card, such that the full mark detector can capture scan and capture marks embedded in the identification card. In these examples, the full mark detector can capture images of the entire surface (e.g., top surface) of the identification card. In some cases, the full mark detector can convert the detected images into digital signals and transmit the digital signals to the user computing device. Then, the user computing device can analyze the digital signals to authenticate the full mark of the identification card.

In some examples, the detecting device can include a partial mark detector to detect a partial mark embedded on the top and/or bottom surface of the identification card, such that the partial mark detector can capture an image of the partial mark embedded in the identification card. In some cases, the partial mark detector can convert the detected image into digital signals and transmit the digital signals to the user computing device. Then, the user computing device can analyze the digital signals to authenticate the partial mark of the identification card. In some examples, the detecting device can include more than one partial mark detector. For example, if the identification card includes more than one security partial marks, more than one partial mark detector can be included in the detecting device.

In some examples, the detecting device can include an embossed mark detector to detect an embossed mark embedded on the top and/or bottom surface of the identification card, such that the embossed mark detector can capture an image of the embossed mark embedded in the identification card. In some cases, the embossed mark detector can convert the detected image into digital signals and transmit the digital signals to the user computing device. Then, the user computing device can analyze the digital signals to authenticate the embossed mark of the identification card. In some examples, the detecting device can include more than one embossed mark detector. For example, if the identification card includes more than one embossed mark, more than one embossed mark detector can be included in the detecting device.

In some embodiments, the user computing device can include one or more processors and memory units configured to process data received from the detecting device. In these embodiments, the memory unit can store standard identification card security features, such as the height and number of layers, full mark, partial mark, and embossed mark embedded in the identification card. In some examples, the user computing device can determine the detected security features (e.g., detected by the detecting device) by analyzing the received digital signals (e.g., generated from the height detector, full mark detector, partial mark detector, and the embossed mark detector) from the detecting device. In some examples, the user computing device can verify the detected security features by comparing these features with the stored standard identification card security features.

FIG. 1 illustrates an example of an identification card (100). For the purpose of description, a specific type of identification card, such as a California-issued "Real ID" card, is shown. However, this example is provided merely as an illustration, and the present disclosure is not limited to specific identification card types or issuing authorities.

As shown in FIG. 1, an identification card (100) can incorporate various embedded security features. Some examples involve the use of multiple layers (102), which may include a top layer that forms the top surface of the card, a bottom layer that forms the bottom surface of the card, and one or more intermediate layers positioned between the top and bottom layers. Each identification card (100) can be characterized by a specific number of layers and corresponding thickness measurements, which can serve as security parameters to verify the card's authenticity. For example, a "Real ID" card issued in California may exhibit an overall thickness of approximately 0.76 mm. The thickness of the raised printed portion (102A) on the front surface of the card is approximately 0.88 mm total, while the thickness of the embossed signature portion (102B) and the embossed date of birth portion (102C) on the back surface is approximately 0.83 mm total. These specific dimensions can function as security indicators, enabling authentication of the identification card. As will be disclosed herein, the identification card authentication system may incorporate precision measurement technologies, such as a camera (e.g., by capturing a side image of the identification card) or laser (e.g., by transmitting laser beams) to detect these thicknesses. By capturing the thickness values and comparing them with predefined specifications (e.g., the standard of the identification card) stored in the user computing device, the identification card can be verified for authenticity.

In addition to layers and thickness, the identification card (100) can include embossed marks, such as a hologram (104), as another security feature. For example, the identification card authentication system may utilize a camera to capture the hologram. The identification card authentication system can determine the authenticity of the hologram by analyzing its optical characteristics, including reflectivity, angular visibility, and diffraction patterns, and comparing these characteristics to predefined hologram specifications stored in a database. This analysis enables the identification card authentication system to verify whether the hologram is genuine or counterfeit.

While FIG. 1 illustrates specific security features, such as layers with distinct thickness measurements and a hologram, these examples are provided for illustration purposes. The present disclosure is not limited to any particular type, number, or combination of security features. For example, additional security features may include ultraviolet (UV) marks, infrared marks, laser-engraved patterns, optically variable devices, barcodes, and microtext. The identification card authentication system may incorporate hardware and software designed to detect, analyze, and verify these security features, ensuring robust and reliable authentication of identification cards.

Figure 2A:
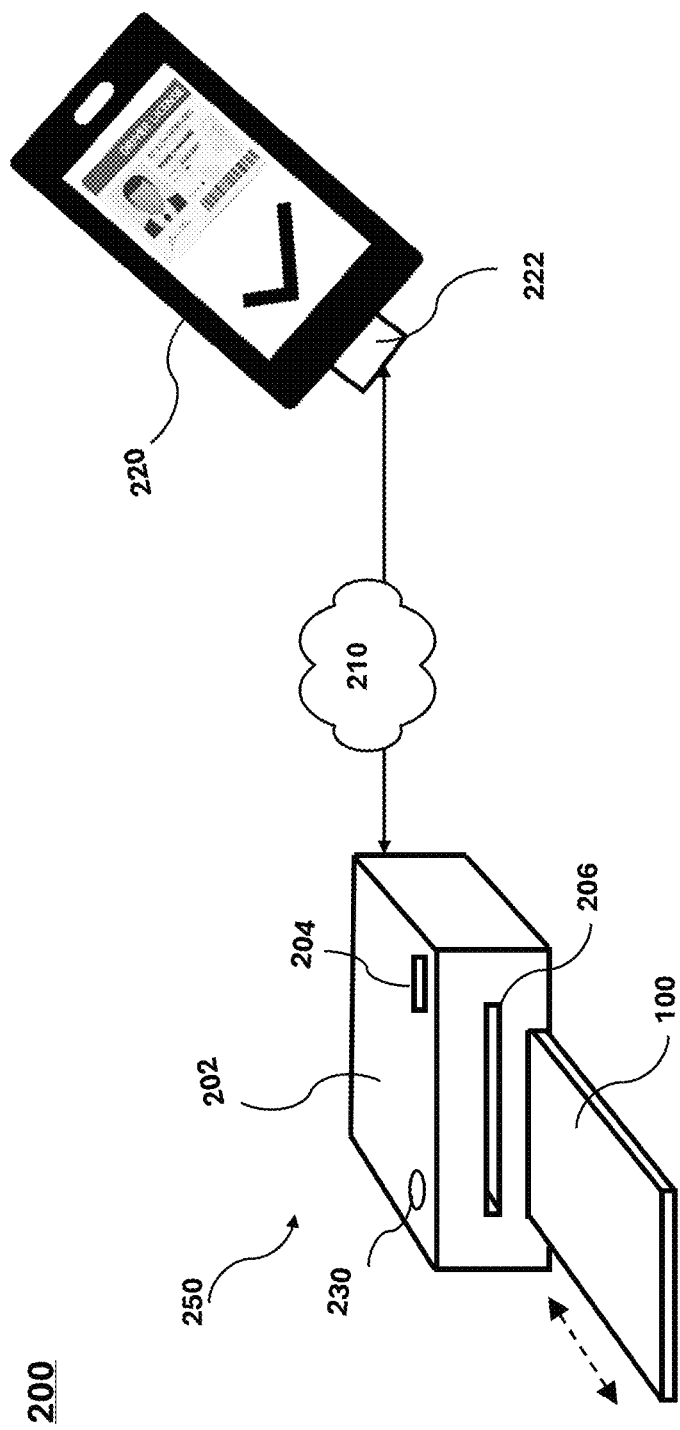
FIG. 2A illustrates an example environment of an identification card authentication system in accordance with the present disclosure.

FIG. 2A illustrates an example environment of an identification card authentication system (200). As illustrated in FIG. 2A, the identification card authentication system (200) can include a detecting device (250) and a user computing device (220) (hereinafter computing device (220)). The detecting device (250) and the computing device (220) are communicatively coupled via a network (210). In some examples, the network (210) can be a wired network by utilizing various types of interface standards (e.g., implemented in an input (222) of the computing device (220)), such as a serial communication interface, parallel communication interface, universal and peripheral interfaces, and the like, and the present disclosure does not limit the numbers and types of the wired interface. In some cases, the network (210) can be a wireless network, such as direct communication channels, wide area networks (WANs), or personal area networks (PANs). Alternatively, it can operate as a wireless network leveraging protocols, such as Wi-Fi, Internet Protocol (IP), Hypertext Transfer Protocol (HTTP), HTTP Secure (HTTPS), or Message Queue Telemetry Transport (MQTT), among others. In some examples, the network (210) (e.g., wireless network) can also include short-range communication protocols such as Bluetooth, Bluetooth Low Energy (BLE), Near Field Communication (NFC), satellite networks, cellular telephone networks, or combinations thereof, such as 3GPP (3rd Generation Partnership Project) network, LTE (Long Term Evolution) network, 5G network, 6G network, WIMAX (World Interoperability for Microwave Access) network, wired or wireless Internet, LAN (Local Area Network), Wireless LAN (Wireless Local Area Network), WAN (Wide Area Network), PAN (Personal Area Network), Bluetooth network, WI-FI network, NFC (Near Field Communication) network, satellite broadcasting network, analog broadcasting network, DMB (Digital Multimedia Broadcasting) network. In other examples, the network (210) can incorporate wireless networks like Global System for Mobile Communications (GSM), Code Division Multiple Access (CDMA), Long Term Evolution (LTE), or other types of wireless networks. The network (210) can also support communication protocols, including Hypertext Transfer Protocol (HTTP), HTTP Secure (HTTPS), Message Queue Telemetry Transport (MQTT), and Constrained Application Protocol (CoAP), among others. Protocols and components for communicating via the Internet or other aforementioned types of communication networks are well known to those skilled in the art and, thus, are not described in more detail herein. In some examples, the computing device (220) can include, without limitations, desktop, laptop, tablet computer, wearable computer, server, personal digital assistant (PDA), hybrid PDA/mobile phone, smartphone, voice command device, digital media player, and the like.

FIG. 2A further illustrates an example of the detecting device (250), having a main body (202). In some examples, the main body (202) can include a power switch (204) to turn on and off or put a standby mode of the detecting device (250). In some cases, the main body (202) can include an identification card slot (206), where the identification card (100) can be inserted.

In some examples, the detecting device (250) can include an indicator (230), such as a light emitting diode (LED), and is designed to intuitively indicate the detecting device (250)'s status. For example, when the detecting device (250) is operating, it displays red (Red), and when the battery is low during wireless connection, the red light blinks slowly. When the detecting device (250) is in standby mode, it displays green (Green), enhancing user convenience.

Figure 2B:
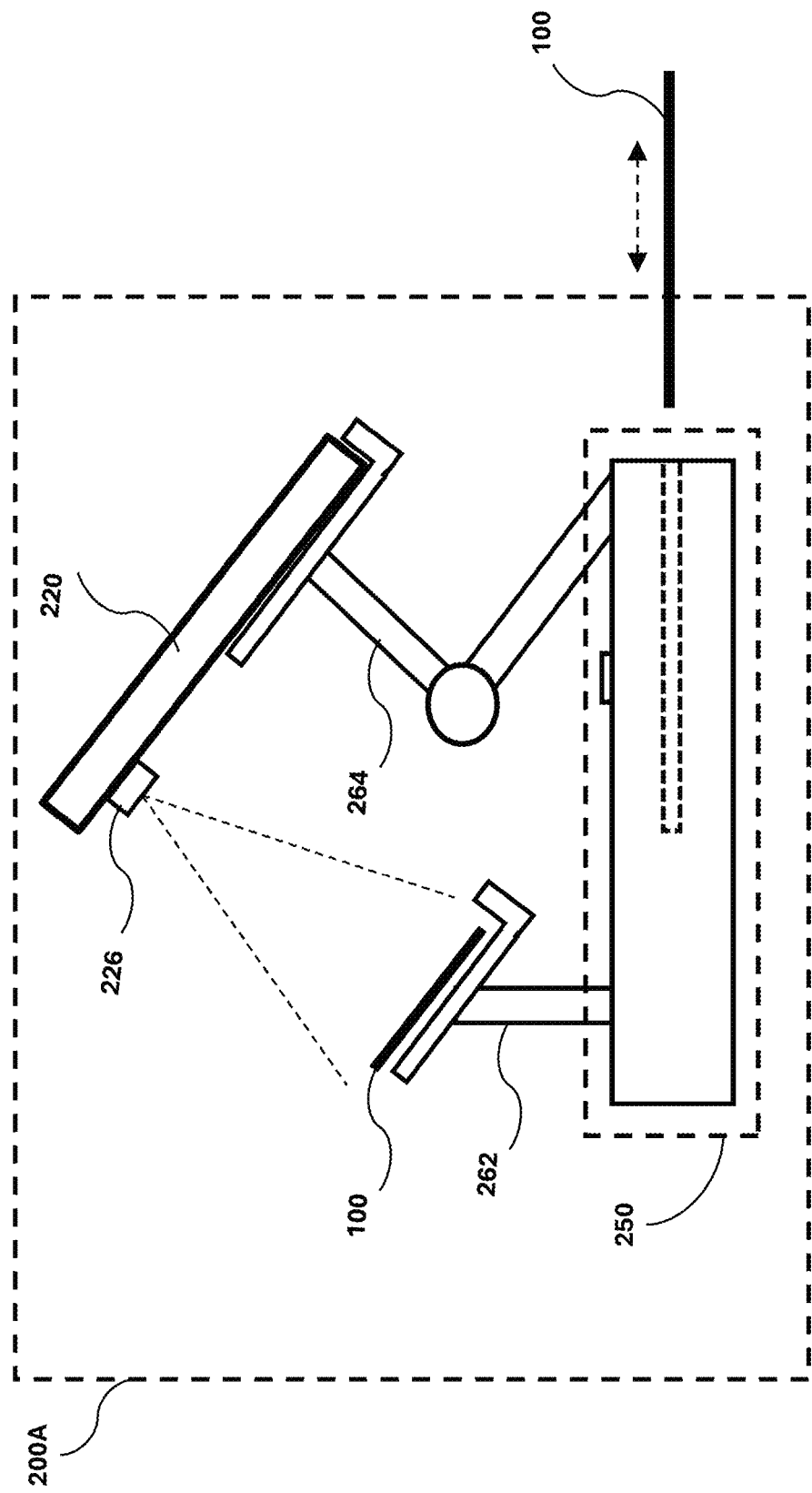
FIG. 2B illustrates an example of the identification card authentication system including a holder in accordance with the present disclosure.

FIG. 2B illustrates an example of the detecting device (250) including a holder (262). In some embodiments, the identification card authentication system (200A) can include an identification card holder (262) mounted on the top of the detecting device (250) and a computing device holder (264) mounted on the top of the detecting device (250). For example, the identification card (100) is placed on the identification card holder (262), and the computing device (220) can be placed on the computing device holder (264). In some examples, a rear camera (226) of the computing device (220) can view the identification card (100) located on the identification card holder (262), such that the computing device (220) can capture the image of the identification card (100).

Figure 3:
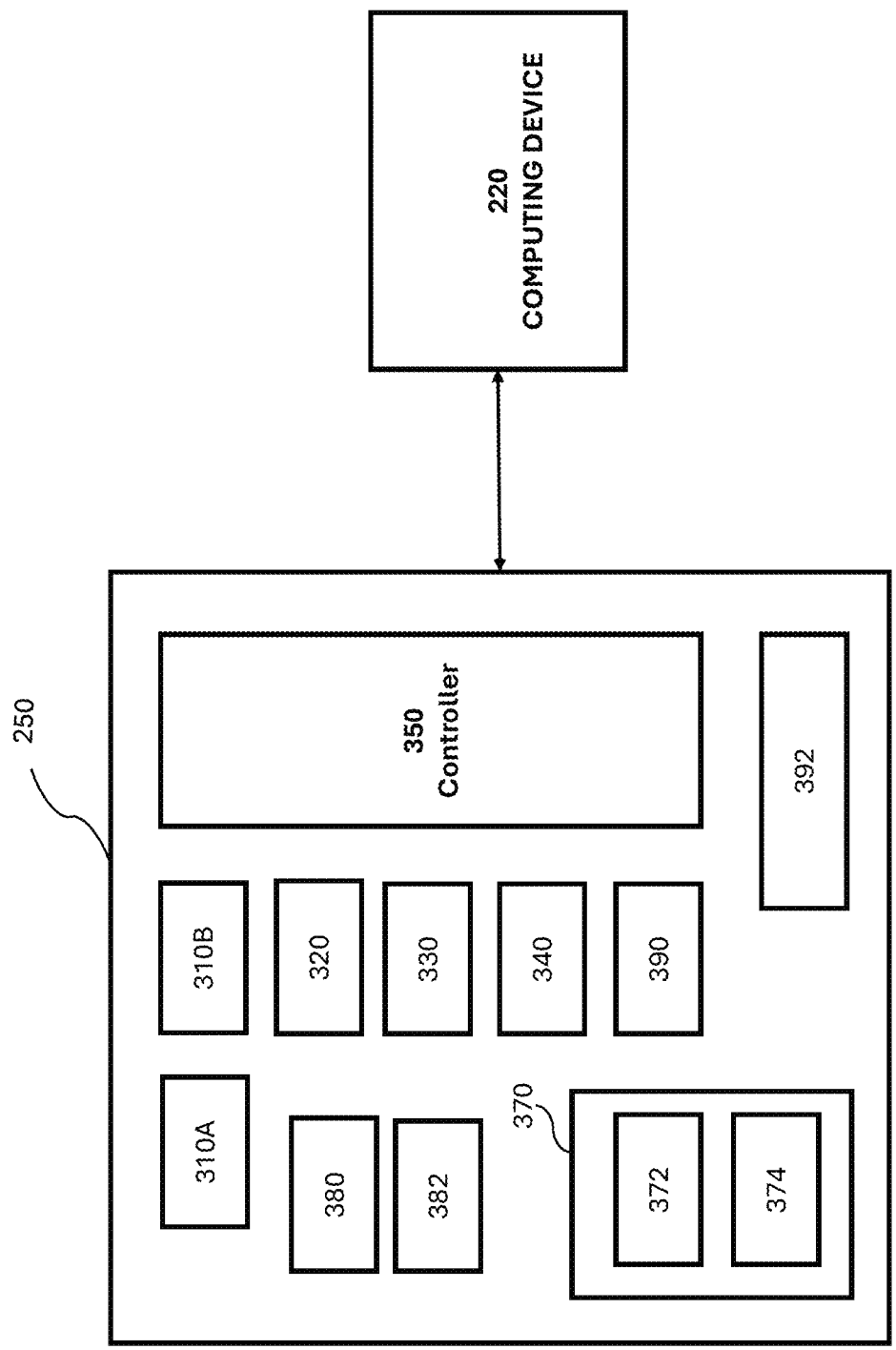
FIG. 3 illustrates an example block diagram of the identification card authentication system in accordance with the present disclosure.

FIG. 3 illustrates an example block diagram of the detecting device (250). As shown in FIG. 3, the detecting device (250) may include multiple subsystems (e.g., sub-device) configured to detect various security features of the identification card (100). The detecting device (250) can also include a controller (350). The controller (350) can control the operations of these subsystems. The detecting device (250) may also include a battery block (370), an encoder (380), a built-in NFC (390), and interface circuitry (392).

As illustrated in FIG. 3, the subsystems may include height detectors (310A and 310B), a full mark detector (320), a partial mark detector (330), and an embossed mark detector (340). In some embodiments, when the identification card (100) is inserted into the identification card slot (206), the detecting device (250) can detect the identification card (100). For example, the detecting device (250) can include a roller (382) that rolls when the identification card (100) is inserted into the identification card slot (206). For example, the roller (382) is positioned to face and contact the identification card (100) (e.g., top, side, or bottom layer of the identification card), such that the roller (382) rolls when the identification card insert slot receives the identification card.

In some examples, the roller (382) is connected to an encoder (380), and the encoder (380) can detect the rolling. In these examples, once the encoder (380) detects the rolling, the encoder (380) can generate a synchronization signal and transmit the signal to the controller (350). In some cases, the controller (350) can initiate the height detectors (310A and 310B), a full mark detector (320), a partial mark detector (330), and an embossed mark detector (340) to detect their corresponding security features of the identification card (100).

In some embodiments, the height detectors (310A) and (310B) can authenticate the identification card by detecting its height and/or number of layers and comparing the measured height and/or number of layers of the identification cards to predetermined authenticity criteria (e.g., the standard identification card's height and/or number of layers). For example, if the standard identification card is known to have a thickness of approximately 1.0 mm, the height detectors (310A and 310B) can detect the thickness of the inserted identification card (100) and determine whether it matches the expected 1.0 mm thickness. Additionally, these height detectors (310A and 310B) can detect the number of layers forming the identification card (100). If the number of layers of the standard identification card includes four layers, the identification card can be authenticated by comparing the detected number of layers and the four layers of the standard identification card.

In some embodiments, the detecting device (250) may utilize different implementations of height detectors. One such embodiment employs the height detector (310A) to detect the height and/or the number of layers of the identification card (100) by capturing light reflected from the card's side. For instance, the height detector (310A) can be positioned to face the first side surface of the identification card. The first side of the identification card can include a side of the top layer, a side of the bottom layer, and a side of one or more intermediate layers. For example, in response to the identification card being inserted into the identification card insert slot, the controller (350) can initiate the height detector (310A) to detect the height of the identification card on the first side of the identification card. In some examples, the height detector (310A) can include a light source configured to illuminate light to the side surface of the identification card inserted into the identification card insert slot and receive reflected light from the side surface of the identification card. The height detector (310A) can also include a camera configured to detect the reflected light and convert the detected reflected light into one or more electrical signals representing the detected height of the identification card.

In some examples, the height detector (310A) can also detect the number of layers. In some cases, each layer of the identification card (100) can include a unique color, such that the side of the identification card (100) includes multiple colors, and each color represents a layer. In various examples, the camera of the height detector (310A) can include a color image sensor to detect the color of each layer of the identification card.

In alternative embodiments, the height detector (310B) can be employed to perform the height or layer measurements using a laser-based approach. In such implementations, the height detector (310B) includes a laser transmitter (e.g., laser beam former) and a corresponding receiver placed on opposite sides of the identification card (100). When a laser beam is emitted by the transmitter, certain portions of the beam may be blocked or attenuated by the card's layers, and the receiver, positioned opposite to the transmitter, detects the transmitted laser energy. By analyzing at least one of the intensity, pattern, or distribution of the received laser beams, the height detector (310B) can ascertain the thickness and the number of layers of the identification card (100).

In some embodiments, the detecting device (250) includes a full mark detector (320) configured to detect security marks, such as ultraviolet (UV) marks, embedded across substantially the entire surface of the identification card (100). The UV mark may be printed using UV-reactive ink that remains invisible under normal lighting conditions and becomes visible only when exposed to UV light. The full mark detector (320) can include a UV light source to illuminate the identification card's surface. By exposing the identification card (100) to UV light and capturing images of the resulting visible UV patterns, the full mark detector (320) can model the detected mark and verify its authenticity. In some examples, the full light detector (320) can scan the surface (e.g., top layer) of the identification card (100), such that when the identification card is inserted into the identification card insert slot, the full mark detector (320) can scan the surface by detecting the security mark (e.g., the UV mark). In some cases, the full mark detector (320) can include one or more cameras, such that each camera can capture the security mark during the scan (e.g., while inserting the identification card into the identification card insert slot). In some embodiments, the camera can include an image sensor to capture the security mark and convert the captured security mark into electrical signals (e.g., digital signal).

In some examples, the full mark detector (320) can be positioned to face the top layer of the identification card. Once the identification card is inserted into the identification card insert slot, the controller (350) can initiate the full mark detector (320) to detect a security mark printed on the top layer of the identification card inserted into the identification card insert slot by scanning the top layer of the identification card. The full mark detector (320) can include a sensor configured to scan the top layer of the identification card.

For example, the sensor can include one or more cameras, and each camera can capture the security mark on the identification card inserted into the identification card slot and convert the captured the security mark into one or more second electrical signals representing the detected security mark of the identification card.

In some embodiments, the detecting device (250) can include one or more partial mark detectors (330) configured to detect UV marks located on specific portions of the identification card's surface rather than across its entire area. For example, if a UV mark is embedded only in the top-right corner of the identification card (100), the partial mark detector (330) directs UV light specifically onto that portion. In some embodiments, the partial mark detector (330) includes a light and a camera. For example, the camera can illuminate a light into the portion (e.g., having a partial mark, such as a partial UV mark) of the top layer of the identification card, and the illuminated light is reflected at the partial mark. In some cases, the camera (e.g., an image sensor of the camera) can detect the reflected light and convert the reflected light into electrical signals, having partial mark information. In various examples, the detecting device (250) can include more than one partial mark detector (330). For example, if the identification card (100) includes more than one partial mark, the detecting device (250) can also include more than one partial mark detector (330), such that each partial mark detector can be positioned to face each partial mark (e.g., a corresponding partial mark) and detect its corresponding partial mark. In some cases, the bottom surface of the identification card (100) can include one or more partial marks. In these examples, the partial mark detector (330) can be positioned to face the bottom layer of the identification card and detect the partial mark embedded on the surface of the bottom layer of the identification card (100).

In some embodiments, the partial mark detector (330) can include a light source configured to illuminate light to the surface of the partial mark embedded on the identification card inserted into the identification card insert slot and receive a reflected light from the surface of the partial mark. The partial mark detector (330) can also include a camera configured to detect the reflected light and convert the detected reflected light into one or more electrical signals representing the partial mark of the identification card.

In some configurations, the detecting device (250) may include only one type or both types of mark detectors (e.g., one type or both types of the full mark detector (320) and partial mark detector (330)). For example, if the identification card authentication system is intended to authenticate identification cards bearing UV marks printed over the entire surface, it may include only the full mark detector (320). Alternatively, if the identification card authentication system needs to authenticate identification cards having UV marks on restricted or localized areas, it may employ the partial mark detector (330) instead. In some cases, if the identification card (100) includes both the full mark (e.g., embedded on the top layer of the identification card) and the partial mark (embedded on the bottom layer of the identification card), the detecting device (250) may include both of the full mark detector (320) and the partial mark detector (330).

In some embodiments, the detecting device (250) can also include an embossed mark detector (340) configured to authenticate embossed security features. Embossed marks may include raised or indented elements, such as textured patterns or images, which can provide a tactile security feature. The embossed mark detector (340) can illuminate the embossed regions from multiple angles and capture images or other sensor data sufficient to construct a three-dimensional model of the embossed mark.

For instance, the embossed mark detector (340) can detect an embossed security mark and include two light sources, a first light source and a second light source. In some examples, each of the first and second light sources can illuminate light to the embossed security mark. The illuminated lights from the first and second light sources can be reflected at the surface of the embossed security mark. In some cases, the embossed mark detector (340) can include a camera to detect the reflected lights, and the camera can include an image sensor to convert the detected reflected lights into electrical signals (e.g., digital signals).

In some examples, the detecting device (250) can include more than one embossed mark detector (340). For example, if the identification card (100) includes more than one embossed mark, the detecting device (250) can also include more than one embossed mark detector (340), such that each embossed mark detector (340) can be positioned to face and detect its corresponding embossed mark. In some cases, the bottom surface of the identification card (100) can include one or more embossed marks. In these examples, the embossed mark detector (340) can be positioned to face the bottom layer of the identification card and detect the embossed marks embedded on the surface of the bottom layer of the identification card (100).

In some embodiments, the embossed mark detector (340) can include a first light source and a second light source, and each light source is configured to illuminate light to the embossed mark embedded on the identification card inserted into the identification card insert slot and receive a reflected light reflected from the surface of the embossed mark. The embossed mark detector (340) can also include a camera configured to detect the reflected lights and convert the detected reflected light into one or more electrical signals representing the embossed mark of the identification card (100).

In some examples, the detecting device (250) can include an encoder (380) to detect the movement of the identification card (100), such as its insertion into an identification card slot (206), as shown in FIG. 2A. When the card is inserted, the encoder (380) may generate a synchronization signal that triggers the height detectors (310A and 310B), the full mark detector (320), the partial mark detector (330), and the embossed mark detector (340), to initiate their respective detection.

In some embodiments, the detecting device (250) can include a controller (350) that coordinates the operations of each detector (e.g., height detectors (310A and 310B), the full mark detector (320), the partial mark detector (330), and the embossed mark detector (340)). In some examples, the controller (350) can receive electrical signals, such as electrical signals representing the detected height of the identification card from the height detector (310A or 310B), electrical signals representing the detected security mark of the identification card from the full mark detector (320), electrical signals representing the detected partial security mark of the identification card from the partial mark detector (330), and electrical signals representing the detected embossed mark of the identification card from the embossed mark detector (340). In these embodiments, the controller (350) can transmit these electrical signals to the computing device (220) via the network (210).

In some embodiments, the computing device (220) may provide computing resources, such as processors and memory to authenticate the identification card by analyzing the electrical signals received from the detecting device (250). By managing data flow and providing computational support, the computing device (220) ensures that the identification card authentication system's authentication tasks are carried out accurately and efficiently.

In some embodiments, the computing device (220) can include a memory, such as non-volatile memory, configured to store security feature profiles for various types of identification cards. For example, different issuing authorities may embed distinct arrangements of security features, such as unique thickness parameters, UV marks, embossed patterns, or other identifying elements. In these embodiments, such different security features can be the standard security features of the identification card, such as a standard height, number of layers, full mark, partial mark, and embossed mark of the identification card. The computing device (220) can store these predefined security feature arrangements (e.g., standard security features of the identification card). The computing device (220) then authenticates the identification card by comparing the electrical signals received from the detecting device (250). For example, the computing device (220) can authenticate the height of the identification card by comparing the electrical signals representing the height of the identification card (e.g., detected by the height detector (310A or 310B)) with the standard height of the identification card. For example, the computing device (220) can authenticate the number of layers of the identification card by comparing the electrical signals representing the number of layers of the identification card (e.g., detected by the height detector (310A or 310B)) with the standard number of layers of the identification card. For example, the computing device (220) can authenticate the full mark of the identification card by comparing the electrical signals representing the full mark of the identification card (e.g., detected by the full mark detector (320)) with the standard full mark of the identification card. For example, the computing device (220) can authenticate the partial mark of the identification card by comparing the electrical signals representing the partial mark of the identification card (e.g., detected by the partial mark detector (330)) with the standard partial mark of the identification card. For example, the computing device (220) can authenticate the embossed mark of the identification card by comparing the electrical signals representing the embossed mark of the identification card (e.g., detected by the embossed mark detector (320)) with the standard embossed mark of the identification card. If any detected security feature deviates from the standard security features, the controller (350) may determine that the identification card has been tampered with or is not genuine.

In some embodiments, the computing device (220) can be connected to a third party authentication service, such as AAMVA (American Association of Motor Vehicle Administrators) in the U.S. or an AI (Artificial Intelligence) database.

In some embodiments, the detecting device (250) can include a battery block (370) providing a portable power source. The battery block (370) may include a rechargeable battery (372) and, in some cases, a wireless charging component (374) to facilitate recharging from an external wireless charger. The wireless charging component (374) may incorporate a coil configured to receive wireless charging energy transmitted as an electromagnetic field from an external charging station (e.g., electromagnetically coupled with the wireless charging component), thereby transferring energy to the battery block (370) without a direct wired connection.

In alternative embodiments, the battery block (370) may be omitted. Instead, the detecting device (250) can receive power directly from an external power source, such as a standard wall outlet (e.g., 110V AC) or another commercially available power supply, without any limitation on the specific power source.

In some embodiments, the detecting device (250) includes a built-in NFC (Near Field Communication, 390) or RFID (Radio Frequency Identification) chip reader. This chip reader can wirelessly access data encoded in the identification card (100) to further verify its authenticity. By reading and interpreting the card's embedded chip data, the detecting device (250) can complement the optical and physical measurements obtained from the other subsystems.

In some embodiments, the detecting device (250) includes interface circuitry (392) configured to establish a connection to the computing device (220) via the network (210), as illustrated in FIG. 2A. Through this network interface, the detecting device (250) may establish the data communication path with the computing device (220).

In some examples, when the user inserts the identification card (100) into the detecting device (250), it can synchronize with one or more subsystems 310A, 310B, 320, 330, and 340, and the encoder (380) can capture the detected images (e.g., detected by 310A, 310B, 320, 330, and 340) consistently. In some examples, the computing device (220) can combine the captured images by time intervals (in time series) to form a continuous image, which can be analyzed for more precise and versatile applications.

Additionally, the back of the identification card (100) may include various security features. In this case, one or more of the detection functions, such as the full UV mark detector (320), the partial UV mark detector (320), or the embossed mark detector (340), can be installed at appropriate locations on the back of the ID card to enhance security. This method enables effective detection of security features and increases reliability.

Figure 4A:
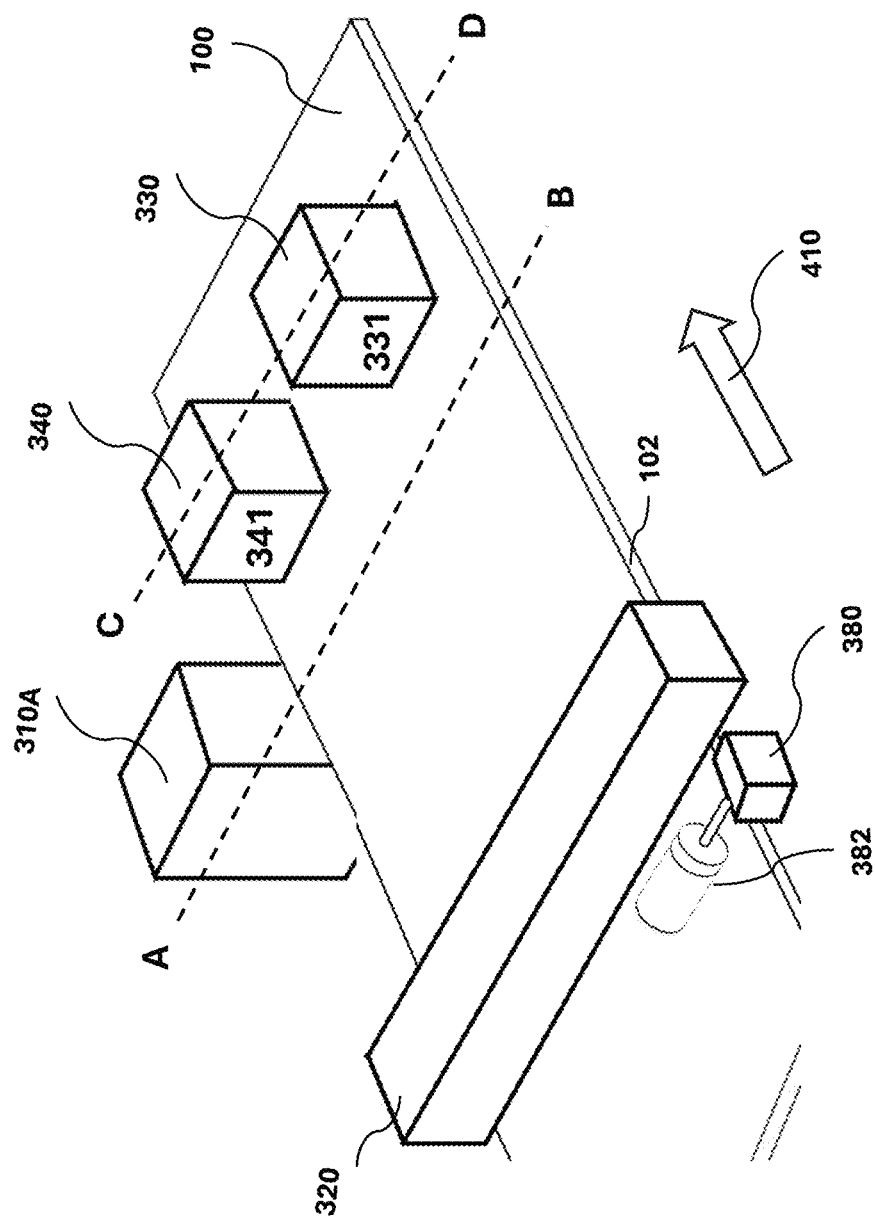
FIG. 4A illustrates an example of a three-dimensional view of an identification card authentication system in accordance with the present disclosure.

FIG. 4A illustrates an example of a three-dimensional view of a detecting device (250). As illustrated in FIG. 4A, the detecting device (250) can include a height detector (310A), a full mark detector (320), a partial mark detector (330), an embossed mark detector (340), an encoder (380), and a roller (382). In some examples, the identification card (100) can be inserted into the detecting device (250) via the identification card slot (206) (as shown in FIG. 2A), and when the identification card (100) is inserted, the roller (382) can begin to roll. In these embodiments, when the roller (382) begins rolling (e.g., upon insertion of the identification card (100)), the encoder (380), which is connected to the roller (382), can detect the rolling motion and determine that the identification card (100) has been inserted.

In some embodiments, once the encoder (380) detects the rolling motion of the roller (382), the height detector (310A), the full mark detector (320), the partial mark detector (330), and the embossed mark detector (340) are initiated to detect their associated security features. In these examples, the controller (350) can receive a signal from the encoder (380), where the signal indicates that the roller (382) has started rolling (or that the identification card (100) has been inserted).

In some examples, the height detector (310A) detects the height and/or the number of layers of the identification card (100) by capturing light reflected from the card's side. The height detector (310A) can then transmit the measured height and/or the number of layers of the identification card (100) to the controller (350). The controller (350) can authenticate the identification card (100) by verifying the measured height and/or the number of layers against predefined authenticity criteria. For example, if the authentic identification card (100) is known to have a thickness of approximately 1 mm, the height detector (310A) can measure the thickness of the inserted identification card (100) to confirm whether it matches the expected 1 mm thickness. Additionally, the height detector (310A) can identify the number of layers forming the identification card (100). If a security feature specifies that the card should have four layers, the controller (350) can verify the number of layers and authenticate the card based on this criterion (e.g., the number of layers).

In some examples, the full mark detector (320) detects security marks, such as UV marks, embedded across the entire surface of the identification card (100). When the roller (382) begins rolling (e.g., as the identification card (100) is inserted), the controller (350) can initiate the full mark detector (320) to detect the UV marks. As the identification card (100) is inserted in direction (410), the full mark detector (320) can illuminate UV light, and the UV light is illuminated across the entire surface of the identification card (100) when the identification card is inserted. The full mark detector (320) can capture images of the resulting visible UV patterns by illuminating the UV light. The captured UV patterns can then be transmitted to the controller (350), where they are authenticated. For example, the controller (350) can compare the captured UV patterns to predefined patterns (e.g., embedded UV patterns in the identification card) to verify the authenticity of the embedded UV patterns on the identification card.

In some examples, the partial mark detector (330) detects security marks, such as UV marks, embedded in specific portions of the identification card's surface rather than across its entire area. When the identification card (100) is fully inserted (e.g., confirmed by the roller (382) and encoder (380)), the controller (350) can initiate the partial mark detector (330) to detect the partial UV marks. For instance, if a security feature of the identification card (100) includes a partial UV mark located in region 331, the partial mark detector (330) can detect the UV mark in that region. For example, after the identification card (100) is inserted in a direction (410), the partial mark detector (330) illuminates UV light on the specific area (e.g., region 331) and captures images of the resulting visible UV patterns. These captured patterns are transmitted to the controller (350), which authenticates them by comparing the captured UV patterns with predefined patterns (e.g., embedded UV patterns corresponding to the identification card). In some examples, the partial mark detector (330) can be positioned to detect the partial mark embedded on the top surface of the identification card (100). In some examples, the partial mark detector (330) can be positioned to detect the partial mark embedded on the bottom surface of the identification card (100). In some cases, more than one partial mark detector (330) can be implemented based on the number of partial marks embedded in the identification card.

In some examples, the embossed mark detector (340) detects security marks such as raised or indented elements (e.g., textured patterns or images providing a tactile security feature). When the identification card (100) is fully inserted (e.g., detected by the roller (382) and encoder (380)), the controller (350) can initiate the embossed mark detector (340) to detect the embossed mark. For instance, if the identification card (100) has an embossed mark located in region 341, the embossed mark detector (340) can detect the mark in that region. As the identification card (100) is inserted in direction (410), the embossed mark detector (340) illuminates the embossed regions from multiple angles and captures images or other sensor data sufficient to construct a three-dimensional model of the embossed mark. The captured images are then transmitted to the controller (350) for authentication. The controller (350) can compare the captured images to predefined patterns (e.g., embedded embossed marks on the identification card). Additionally, the controller (350) can analyze individual images taken at multiple angles to identify tampering. For example, if the captured images (e.g., of reflected light at various angles) exhibit inconsistencies, the embossed mark can be identified as tampered. In some examples, the embossed mark detector (340) can be positioned to detect the embossed mark embedded on the top surface of the identification card (100). In some examples, the embossed mark detector (340) can be positioned to detect the embossed mark embedded on the bottom surface of the identification card (100). In some cases, more than one embossed mark detector (340) can be implemented based on the number of partial marks embedded in the identification card.

Although FIG. 4A illustrates a specific example of the arrangement of components in the detecting device (250), the present disclosure is not limited to this example. For instance, in alternative embodiments, the height detector (310A) can be replaced with a different type of height detector (e.g., height detector (310B)). Furthermore, the arrangement of the full mark detector (320), the partial mark detector (330), and the embossed mark detector (340) can be adjusted based on the embedded security features of the identification card. For example, if the identification card includes either a full UV pattern or a partial UV pattern, the full mark detector (320) or the partial mark detector (330), respectively, can be implemented in the detecting device (250). In some examples, the position of the partial mark detector (330) can be adjusted based on the location of the embedded partial UV pattern. Multiple partial mark detectors (330) can also be implemented to detect multiple partial UV marks embedded in the identification card. Similarly, the position of the embossed mark detector (340) can be adjusted based on the location of the embossed mark, and multiple embossed mark detectors (340) can be implemented if the identification card includes multiple embossed marks. In addition, non-roller card insertion detection mechanism, including but not limited to, an infrared detector, a photo-diode detector, a light-reflection detector, a motion detector, etc. can also be used to detect an insertion of the identification card.

Figure 4B:
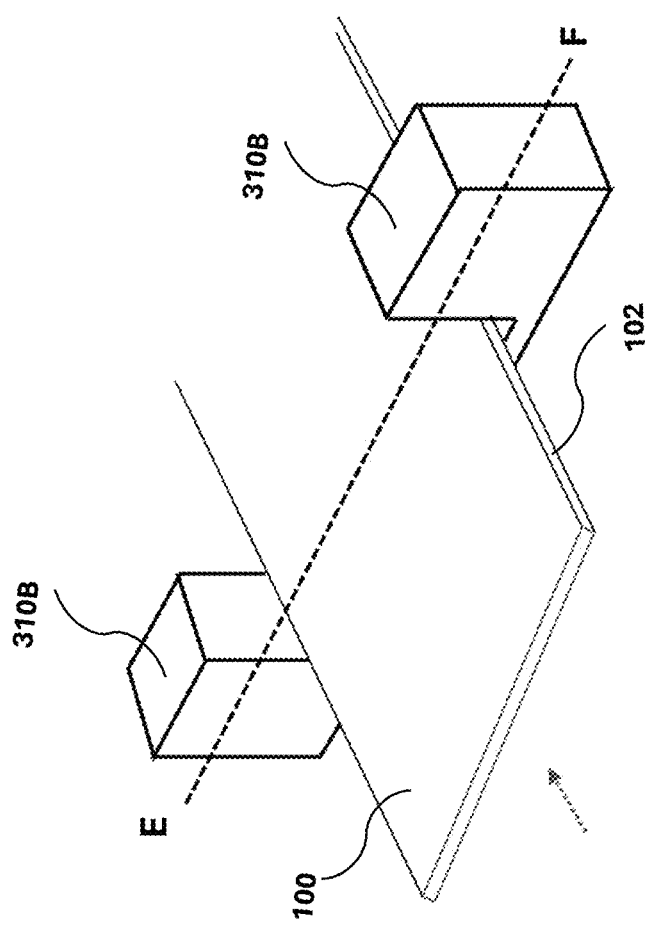
FIG. 4B illustrates another example of a height detector that can be implemented in the identification card authentication system of FIG. 4A in accordance with the present disclosure.
Figure 6:
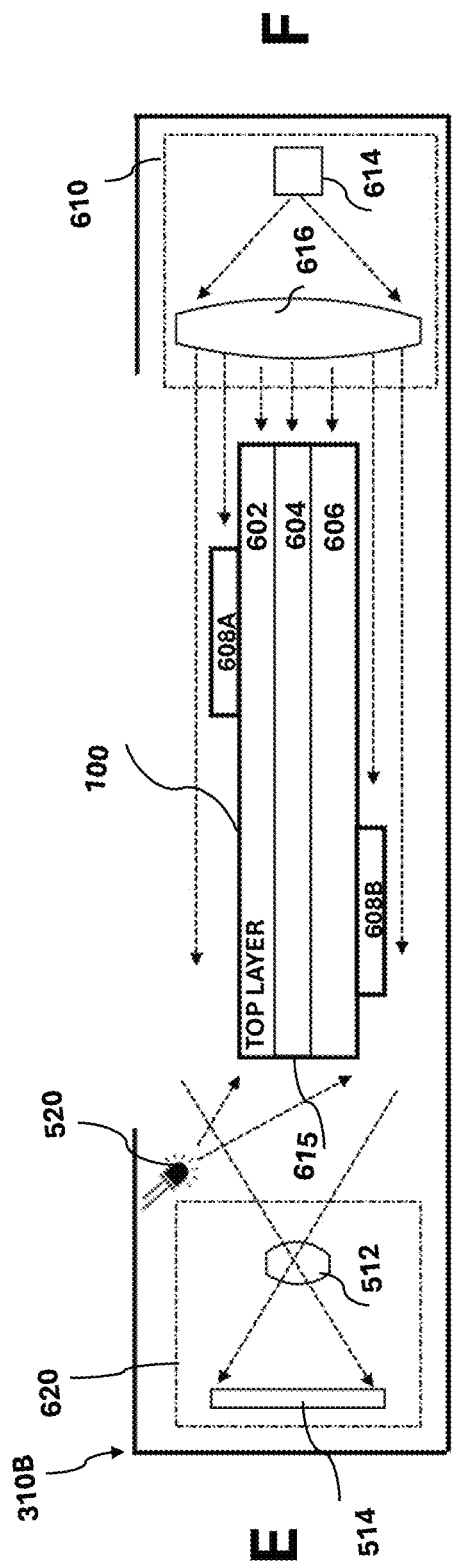
FIG. 6 illustrates an example of a height detector for detecting height and/or number of layers of an identification card by using a laser in accordance with the present disclosure.

FIG. 4B illustrates another example of the height detector (310B) that can be implemented in FIG. 4A (e.g., replacing the height detector (310A)). As will be described in FIG. 6 in more detail, the height detector (310B) utilizes laser beams to detect the multiple layers (102) of the identification card (100). For example, FIG. 6 illustrates the cross section view (E-F) of the height detector (310B)

Figure 5A:
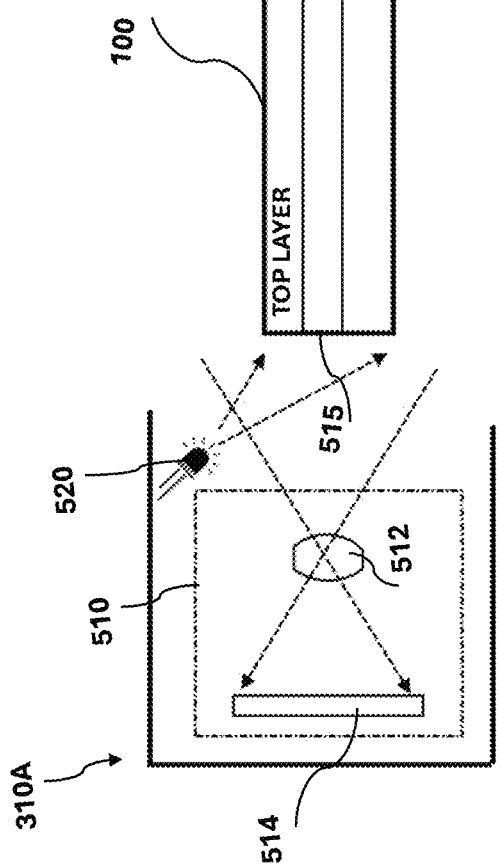
FIG. 5A illustrates an example of the height detector for detecting height and/or number of layers of an identification card in accordance with the present disclosure.

FIG. 5A illustrates an example of the height detector (310A) for detecting height and/or the number of layers of an identification card (100). The height detector (310A) illustrates a cross section view of A-B (e.g., corresponding to the cross section view A-B shown in FIG. 4A). As illustrated in FIG. 5A, the height detector (310A) can include a camera (510) and at least one light source (520). The camera (510) can include a lens (512) that focuses the reflected lights and an image sensor (514) that receives the light coming through the lens and converts it into an electrical signal (such as a digital signal). This configuration is designed to efficiently perform the process of light focusing and signal conversion. In some embodiments, the identification card 100 can include a top layer (502), an intermediate layer (504), and a bottom layer (506). In some embodiments, the intermediate layer (504) can include one or more layers. In various embodiments, the number of layers (e.g., the number of intermediate layers) and the height of the identification card (e.g., the height of the top, intermediate, and bottom layers) can be embedded in the identification card as its security feature. Thus, verifying this security feature may authenticate the identification card.

In some examples, the image sensor (514) can be selected from suitable sensors, such as one dimensional (linear type, Charge Coupled Device (CCD), Contact Image Sensor (CIS)), two dimensional (Complementary Metal-Oxide-Semiconductor (CMOS), or three dimensional sensors. In some cases, since the side (515) of the identification card (100) (e.g., the side of each layer of the identification card) is embedded with a unique color, detection of the unique color can be used to authenticate the identification card. In these cases, the image sensor (514) can be a color image sensor. In some examples, the resolution of the image sensor (514) may have at least a pixel resolution of 0.02 mm (20 μm, micrometers).

In some examples, the light source (520) can include one or more surface-mount type (SMD-type) light emitting diodes (LEDs), and a specific type of the LED can be selected based on the type of image sensor (514). For example, when the image sensor (514) is a color image sensor, a white LED can be used. In other examples, if the image sensor (514) is a monochrome image sensor, a red LED or infrared (IR) LED can be used as the light source (520). In some examples, the light source (520) can be designed to focus the illumination on the side (515) of the identification card (100), which generally has a thickness of approximately 0.76 mm. Additionally, the light source (520) can be positioned in such a way as to avoid creating excessive brightness (hotspots) on the image sensor (514).

Figure 5B:
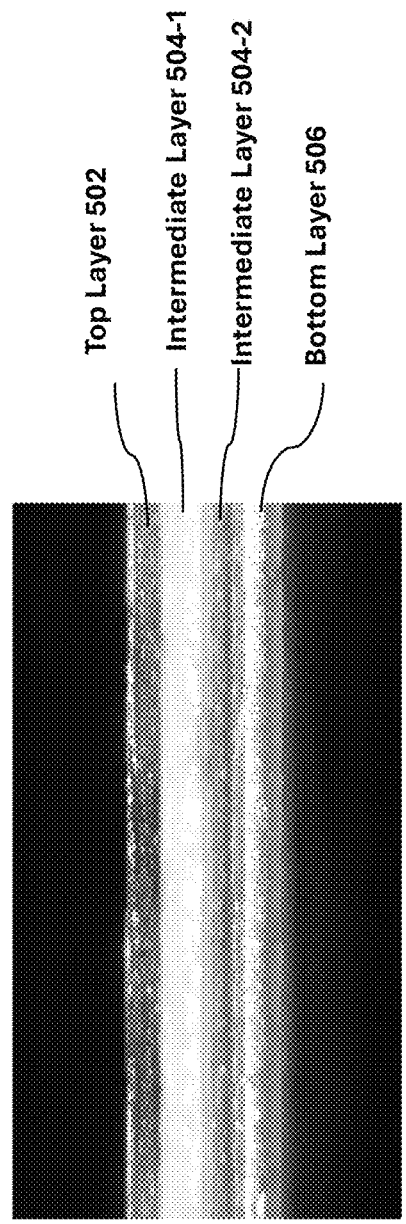
FIG. 5B illustrates an example number of vertical layers of security features embedded in an identification card in accordance with the present disclosure.

FIGS. 5B and 5C illustrate examples of the height and number of layers of security features embedded in an identification card. For example, FIG. 5B shows an example of a side of an identification card having four layers (e.g., the top layer (502), two intermediate layers (504-1 and 504-2), and the bottom layer (506)). FIG. 5C shows an example of an identification card (e.g., a U.S. work permit card) having three layers (a top layer (502), an intermediate layer (504), and a bottom layer (506)). As further illustrated in FIG. 5C, the intermediate layer embedded with a red color. In some embodiments, the number of layers and/or unique color of one or more layers can represent one of the embedded security features of the identification card.

In some embodiments, if the image sensor (514) can use an infrared sensor (IR) sensor. In other examples, if the image sensor (514) does not include the IR sensor, an IR filter can be implemented to the rear of the lens (512). These embodiments can help to block unnecessary infrared signals, thereby improving image quality and enhancing the accuracy of the analysis.

In some examples, the height detector (310A) can be positioned on the side of the identification card (100). However, the present disclosure does not limit the position of the height detector (310A), and it can be relocated as needed. Additionally, multiple height detectors (310A) can be used simultaneously to enable more precise detection, depending on specific types of security features implemented in the identification card.

Figure 5D:
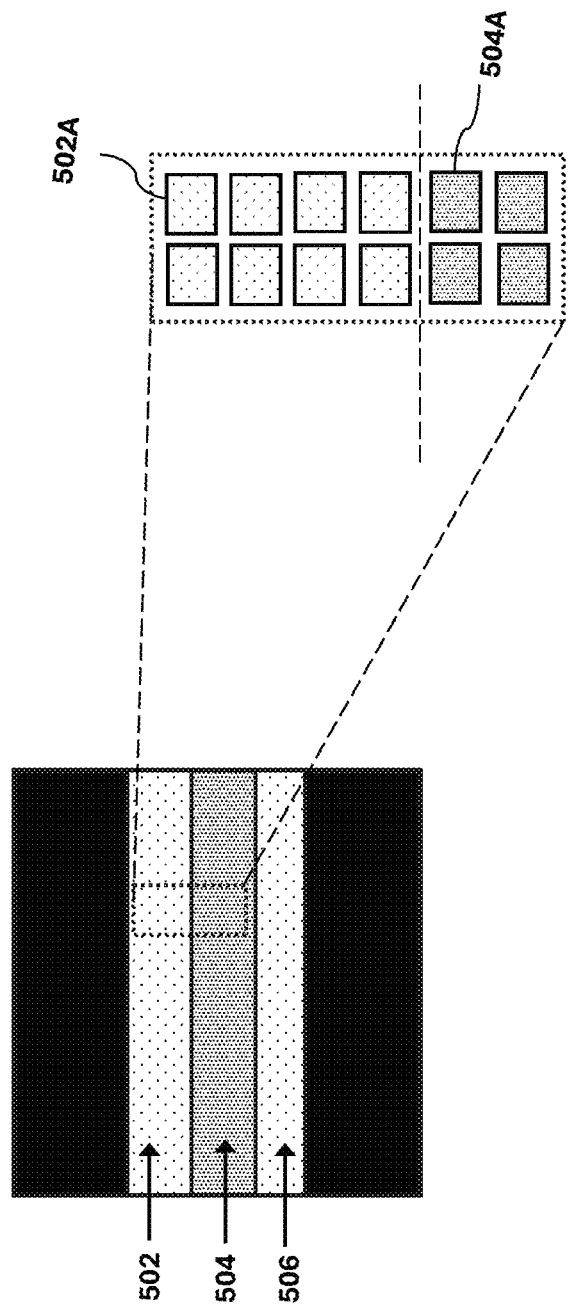
FIG. 5D illustrates an example of a captured side image of the identification card in accordance with the present disclosure.

FIG. 5D illustrates an example of captured side image of the identification card (100). In some examples, the identification card authentication system (200) can determine the height of each layer of the identification card (100). As illustrated in FIG. 5D, each layer (502, 504, 506) of the captured side image can include pixels. For example, the captured layer (502) can include pixels of the 502A, and the captured layer (504) can include the pixels of the 504A. In some cases, the height of each layer of the identification card can be determined by counting the pixels of the corresponding layers of the captured side image. For example, the computing device (220) can count the number of pixels in each layer of the identification card (100) and determine the height of each layer and the height of the identification card (100).

FIG. 6 illustrates an example of a height detector (310B) for detecting height and/or number of layers of an identification card (100) by using a laser. As illustrated, FIG. 6 depicts a cross section view E-F (corresponding to the cross section E-F of FIG. 4A) of the height detector (310B). In some embodiments, the height detector (310B) can include a laser beam source module (610) positioned on one side of the identification card (100) and a laser detector (620) positioned on the opposite side of the laser beam source module (610). In some embodiments, the laser detector (620) can include the lens (512) and the image sensor (514). In some examples, the laser detector (620) can also include the light source (520) that illuminates light to a side (615) of the identification card (100). In some embodiments, the laser beam source module (610) can include a laser beam source module (610). The laser beam source module (610) can include a laser diode (614), and a prism or lens (616). In some examples, the laser diode (614) can generate a laser beam and transmit the laser beam to the lens (616). In some examples, the lens (616) can scatter the laser beam into multiple laser beams. In some cases, the lens (616) can diffuse the laser beam based on the number of layers, such that each layer of the identification card (and the raised portions of the identification card) can receive a laser beam (e.g., a scattered or diffused laser beam by the lens (616)), enabling accurate measurement of the thickness of different areas of the identification card.

In some embodiments, the laser detector (620) can scan laser light transmitted from the laser beam source module (610) positioned on the opposite side of the laser detector (620). For example, the image sensor (514) can capture the laser and measure the thickness of the identification card (100).

In some examples, the height detector (310B) can measure the height of the identification card in various areas of the identification card. For example, the identification card may include a top layer (602), one or more intermediate layers (604), and a bottom layer (606). In some examples, the top layer (602) can include a raised portion (608A), such as text or mark. In some cases, the bottom layer (606) can also include a raised portion (608B). Thus, when the laser is transmitted from the laser beam source module (610) to the laser detector (620), the laser beams emitted to the raised portions (608A) (608B) can be blocked, such that these blocked laser beams may not be detected at the image sensor (514). As a result, these areas (e.g., blocked by the raised portions (608A) (608B)) may be represented at the image sensor (514), darker than other regions where the laser light passes through. By utilizing these contrasts, the thickness of the identification card can be determined.

In some examples, a "Real ID" card issued in California may exhibit an overall thickness of approximately 0.76 mm. The thickness of the raised printed portion (102A) on the front surface of the card is approximately 0.88 mm total, while the thickness of the embossed signature portion (102B) and the embossed date of birth portion (102C) on the back surface is approximately 0.83 mm total. In these examples, the height detector (310B) can be installed on the horizontal side of the identification card. In some embodiments, more than one height detector (310B) can be used simultaneously.

Figure 7:
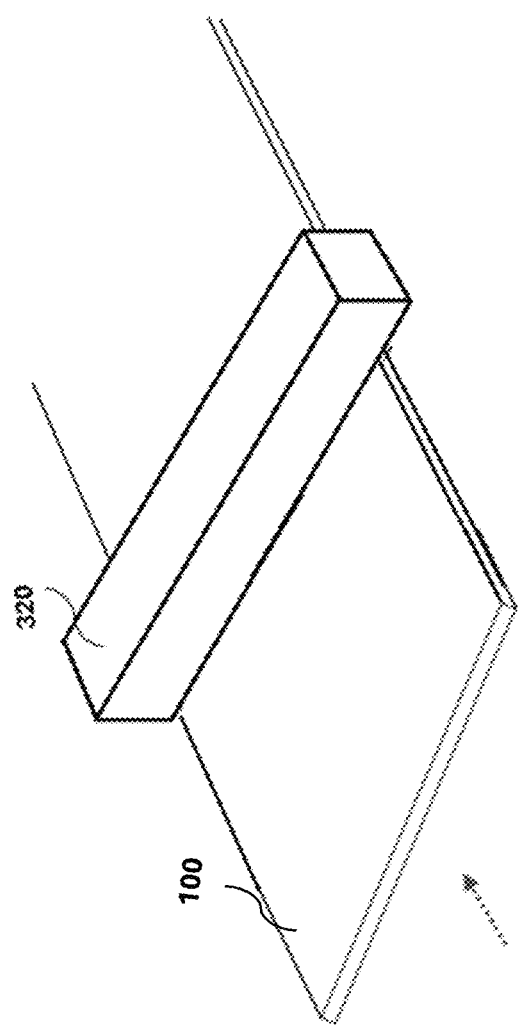
FIG. 7 illustrates an example of a full mark detector for detecting security marks, such as UV marks in accordance with the present disclosure.

FIG. 7 illustrates an example of a full mark detector (320) for detecting security marks, such as UV marks. In some examples, the UV mark can be embedded across substantially the entire surface of the identification card (100). In some examples, the full mark detector (320) can extract the UV marks from the entire surface of the identification card and generate (or model) an image for authentication of the UV marks.

In some examples, a government-issued identification card (or generally referred to as an ID-1 format card) follows international standards and have dimensions of about 85.60 mm in width and 53.98 mm in height. When converted to inches, this is approximately 3⅜×2⅛ inches.

In some embodiments, the full mark detector (320) can include a Contact Image Sensor (CIS sensor). In some cases, the CIS sensor is structured by arranging the partial (UV) mark detector (330) in a very precise line. For high-precision analysis, such as OCR (Optical Character Recognition), it is recommended to use components with a resolution of 300 DPI (Dots per Inch) or higher. This means that when scanning the vertical axis of the identification card (100) by line, a CIS sensor with at least 638 pixels is required at 300 DPI. The calculation can be as follows: 2.126 inches (53.98 mm)×300 DPI=638 pixels.

In some embodiments, when the user manually inserts the identification card (100), the roller (382) that contacts the identification card (100) rotates, and the encoder (380), which is mechanically connected to the roller (382), can generate a synchronization signal. This synchronization signal can be an electronic pulse created by the photo-coupler, photo-interrupt, or magnetic detection sensor inside the encoder (380) as its gears (e.g., connected to the roller (382)) rotate. In some examples, the controller (350) receives this synchronization signal. The controller (350) can control the lighting and individual sensors within the CIS sensor to capture the image signal. The resolution of the encoder (380) can match the image resolution of one line along the vertical axis. For example, if the vertical axis is 300 DPI, the resolution of the encoder (380) that synchronizes with the horizontal axis can also be 300 pulses per inch. For example, when the user inserts the card at a speed of 10 cm/sec (centimeters per second, approximately 4 inches per second), the frequency of the pulses generated by the encoder (380) is 1182 Hz (Formula: f=3.94 inches/sec×300 pulses/inch). In this case, the controller (350) can capture the entire linear image from the CIS sensor, for example, every 847 microseconds (μs). The controller (350) can repeat this process to generate a two dimensional image of the UV marks.

Figure 8A:
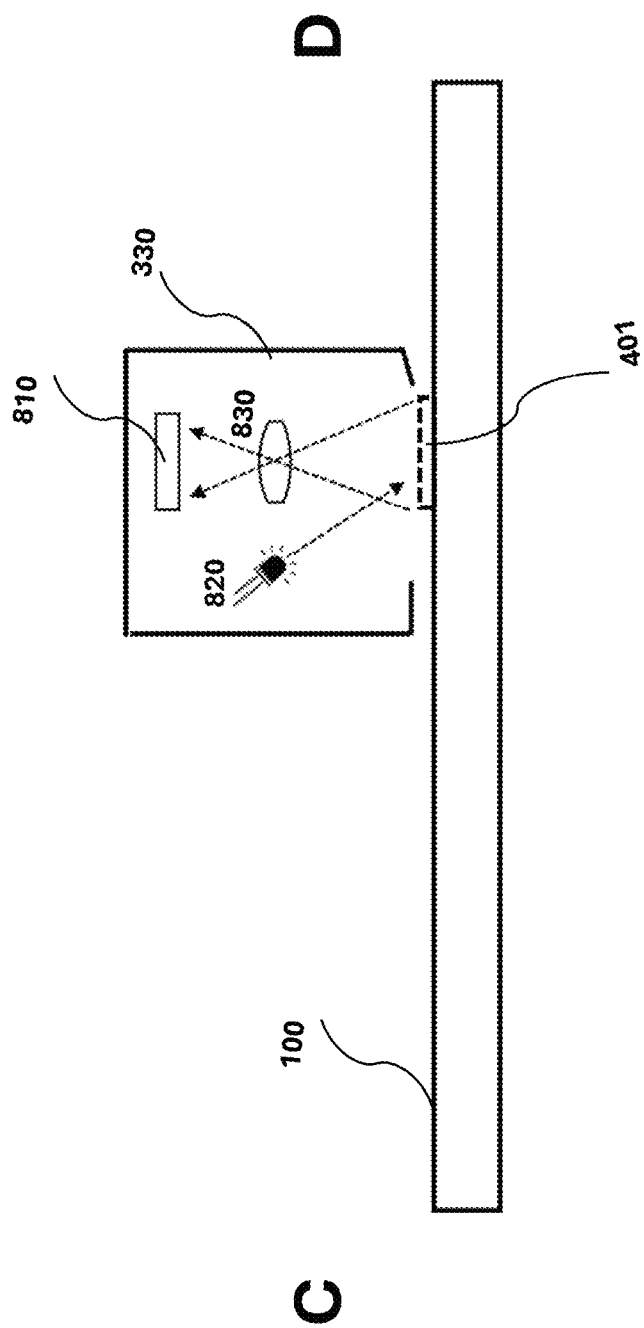
FIG. 8A illustrates an example of a partial mark detector in accordance with the present disclosure.

FIG. 8A illustrates an example of a partial mark detector (330). As illustrated, FIG. 8A depicts a cross section view C-D (corresponding to the cross section C-D of FIG. 4A) of the partial mark detector (330). As illustrated in FIG. 8A, the partial mark detector (330) can include a color sensor (810), at least one UV light source (820), and a lens (830) that focuses the light. Since the position, size, and number of UV marks inserted into the identification cards vary by the issuing authorities, the number and position of the partial (UV) mark detector (330) can be adjustable.

In some embodiments, the partial mark detector (330) can measure a color density of a specific area (e.g., having the partial UV pattern) using a single color sensor (810) without needing other image sensors, such as CIS, one dimensional, two dimensional, or CMOS image sensors.

In some embodiments, the UV light source (820) can use an SMD-type LED, having the wavelength range of the UV ink used in the identification card. For example, the wavelength can include about 365 nm (nanometers).

In some examples, when the UV light is reflected off the surface (401) (e.g., a region having the UV mark) of the identification card, the color can either be visually observed or detected by the color sensor (810), depending on the printed areas. For example, the output of the color sensor (810) can be provided as an analog or digital signal (e.g., values), with three different values corresponding to the primary colors (RGB=Red, Green, Blue). In the case of a digital output, the result can be represented numerically depending on the resolution. For example, when a sensor with 8-bit resolution detects orange, it would output values of R=255, G=165, B=0.

Figure 8B:
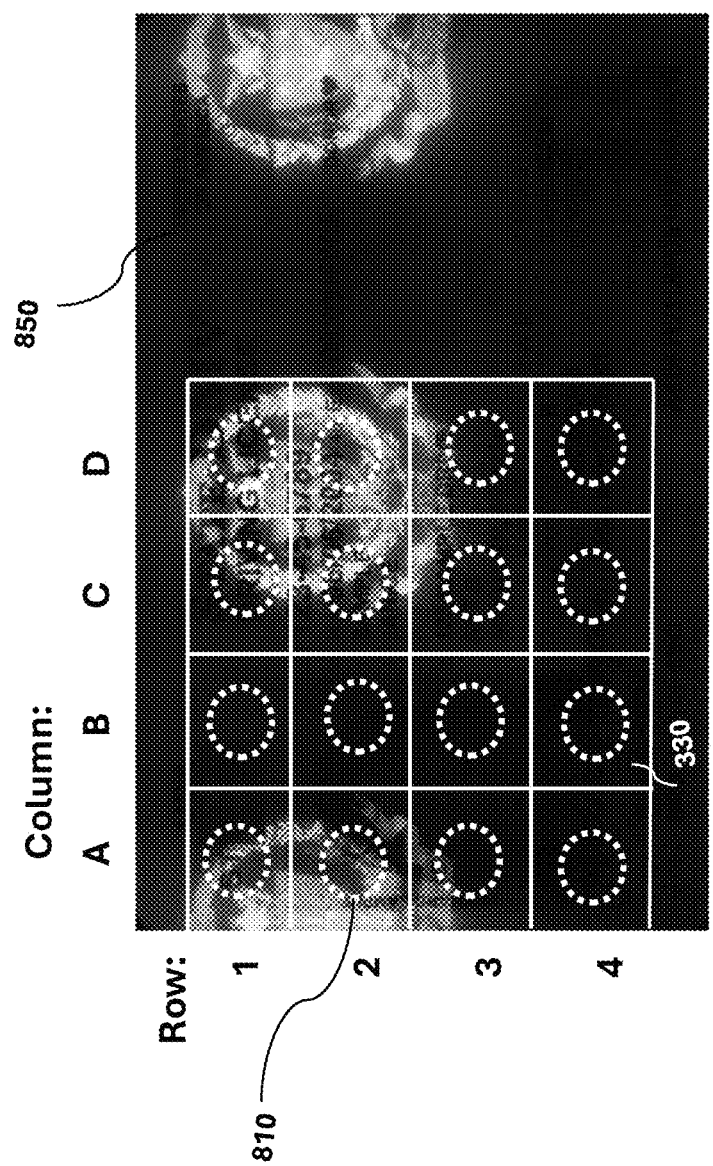
FIG. 8B illustrates an example with sixteen partial mark detectors, arranged as four units horizontally and four units vertically in accordance with the present disclosure.

FIG. 8B illustrates an example with sixteen partial mark detectors (330), arranged as four units horizontally and four units vertically. Each partial mark detector (330) can generate images (810) (e.g., dashed circular line). For example, as illustrated in FIG. 8B, the circular image (810) can represent the area detected by one UV mark detector (330). Additionally, the background (850) in FIG. 8B can represent a two dimensional image generated when the UV light illuminates the entire ID card (e.g., detected by the full mark detector (320)), which may include various colors.

Figure 9A:
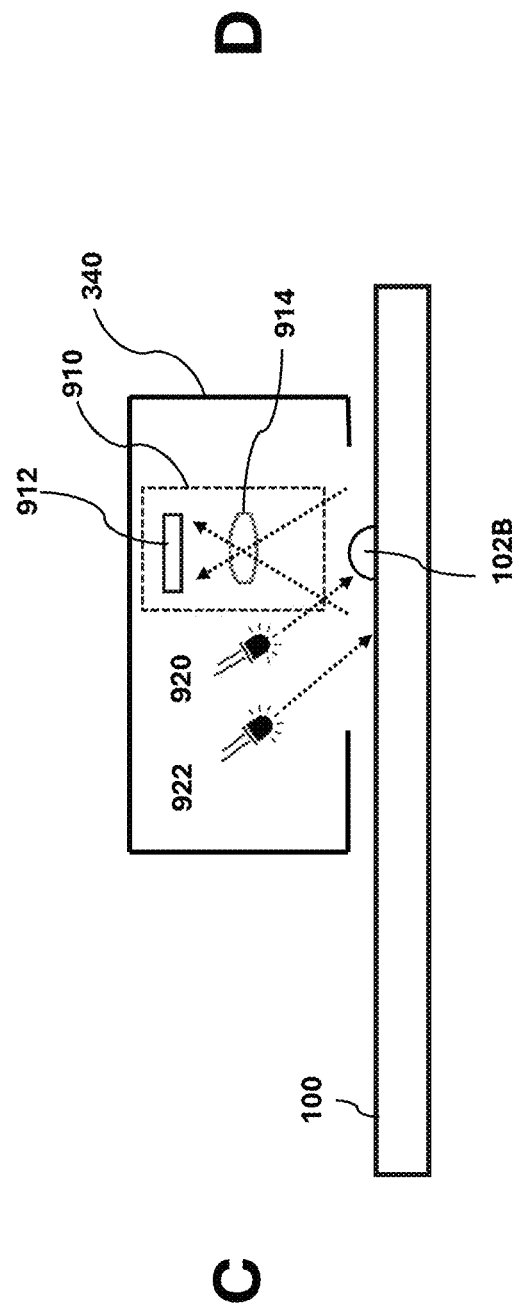
FIG. 9A illustrates an example of an embossed mark detector in accordance with the present disclosure.

FIG. 9A illustrates an example of an embossed mark detector (340). As illustrated, FIG. 9A depicts a cross section view C-D (corresponding to the cross section C-D of FIG. 4A) of the embossed mark detector (340). As shown in FIG. 9A, the embossed mark detector (340) can include a camera (910) and at least two light sources (920, 922). The camera (910) can include a lens (914) that focuses light and a two dimensional image sensor (912) that converts the light into an electrical signal. In some examples, the embossed mark detector (340) follows the design specifications set by the AAMVA (American Association of Motor Vehicle Administrators), with the primary mark located in the area below the photo (signature section). In these examples, the position of the embossed mark detector (340) can be installed so that the embossed mark detector (340) can detect the area above the signature section of the identification card. In some embodiments, the identification card (100) can include the embossed mark in various points of the identification card (100), and location of the embossed mark detector (340) can be adjusted based on the position of the embossed mark on the identification card (100).

In some embodiments, the two dimensional image sensor (912) can be operated by comparing images based on the angular difference between the two light sources (920) (922). In some examples, a low-resolution type (e.g., VGA format, 640×480 pixels) can be used than a high-resolution to increase the efficiency in terms of implementation cost of the high-resolution image sensor. The two dimensional image sensor (912) can be either a color or monochrome type image sensor. Additionally, a 3D image sensor or a two dimensional time of flight (TOF) sensor could be used as an alternative to the 2D image sensor (912).

In some examples, the light sources (920, 922) can use small SMD-type LEDs. If the two dimensional image sensor (912) is in color, it is suitable to use white LEDs, while red LEDs are used for monochrome sensors. An installation example involves shining light over the signature area of the identification card (100), where one light source (920) is positioned close to the signature area, and the other light source (922) is installed to emit light from a different angle to the signature area. Another example can involve installing one light source (920) and the other light source (922) in vertically, where the horizontal distances from the camera (910) to the light source (920) and another light source (922) are different. For example, the light sources (920) and (922) can have the same vertical position, but the horizontal distance from the camera (910) to the light source (920) can be further than the horizontal distance from the camera (910) to the light source (922).

Figure 9C:
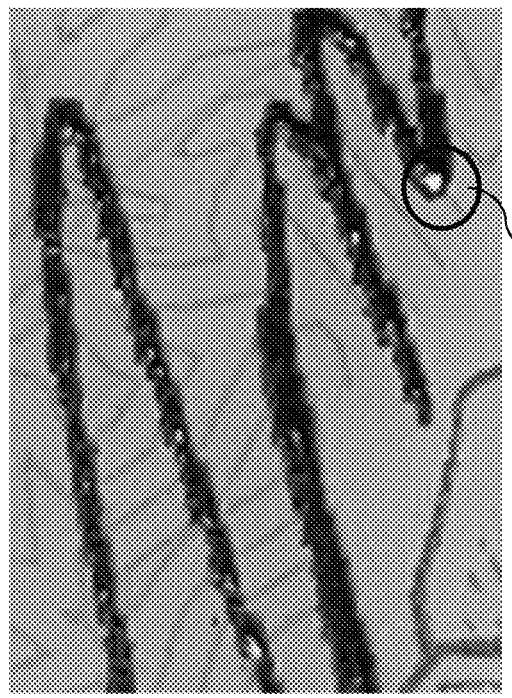
FIG. 9C illustrates another example of captured embossed marks by using the embossed mark detector in accordance with the present disclosure.
Figure 9B:
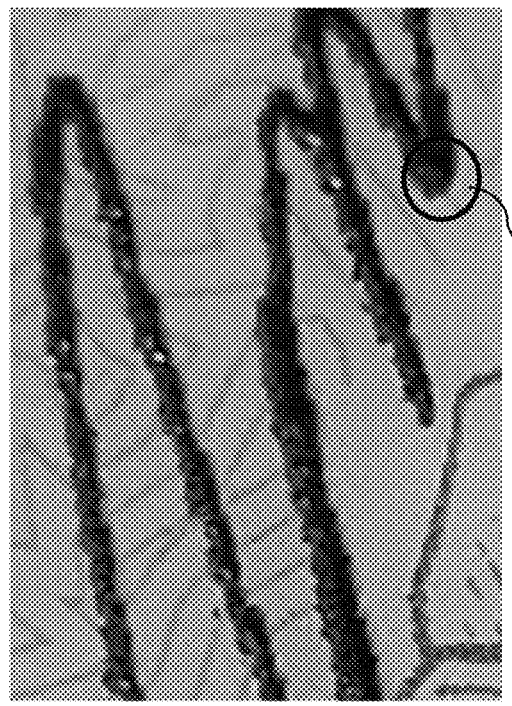
FIG. 9B illustrates an example of captured embossed marks by using the embossed mark detector in accordance with the present disclosure.

FIGS. 9B and 9C illustrate examples of captured embossed marks by using the embossed mark detector (340). As illustrated in FIG. 9A, the embossed mark is captured using one of the two light sources and in FIG. 9B, the embossed mark is captured with the other light source while the first (e.g., the light source (920)) is turned off, the differences between regions 950 and 960 can be observed. By comparing these two images, it is possible to determine whether the area is embossed.

Figure 10:
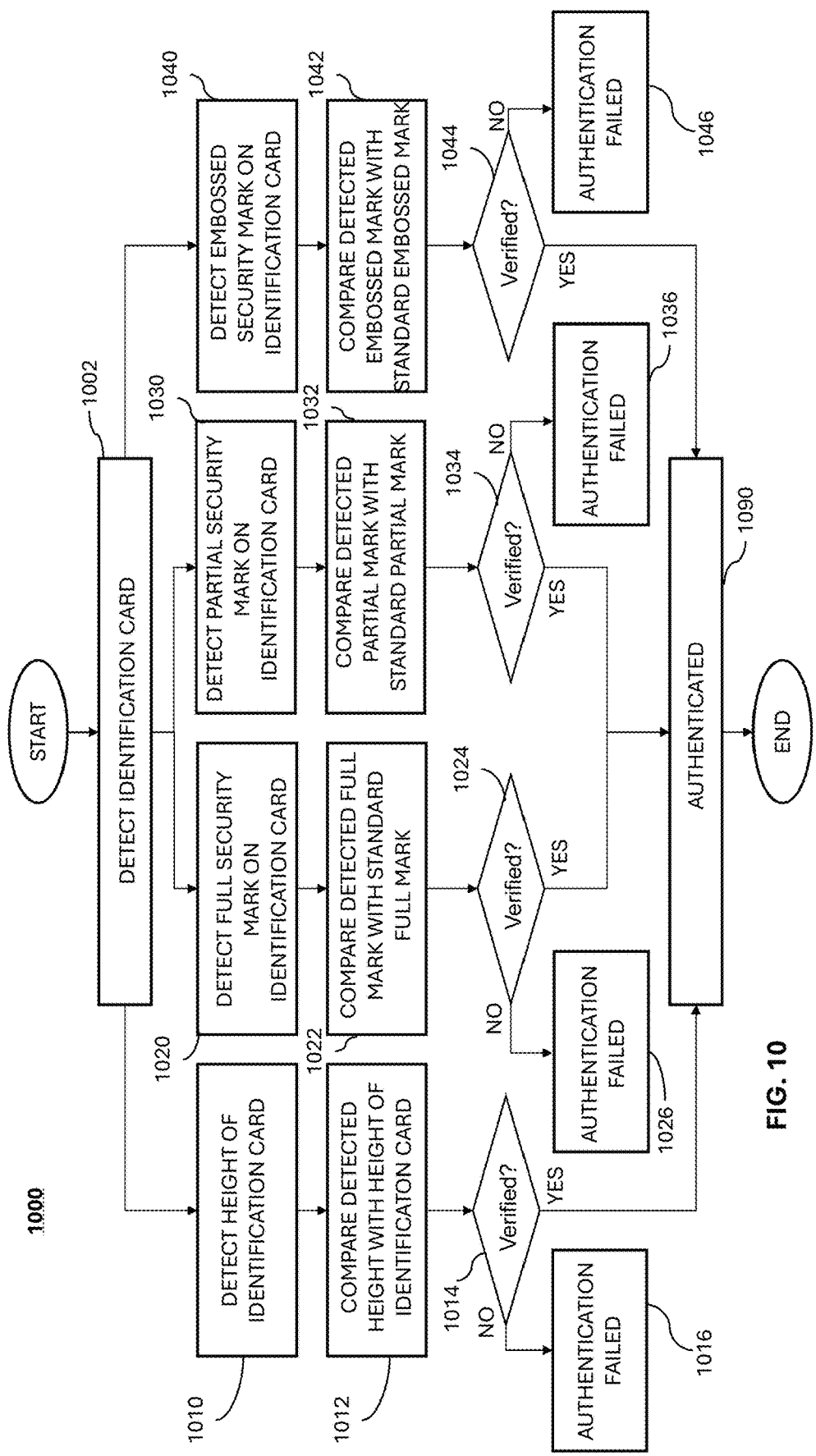
FIG. 10 is a flow diagram depicting an example process implemented by the identification card authentication system in accordance with the present disclosure.

FIG. 10 is an example process flow diagram (1000) of a method of authenticating an identification card according to some embodiments. The process flow diagram (1000) may be implemented by the identification card authentication system (200) (see FIG. 3). FIG. 10 is merely an example process flow diagram for data processing within the identification card authentication system (200), and the method can be modified based on application and specific security features embedded in an identification card. For example, certain states may be removed, other states added, two or more states combined, or one state can be separated into multiple states depending on the specifications and requirements. For instance, if the identification card includes security features of a partial mark rather than a full mark, the states 1020, 1022, 1024, and 1026 can be removed. In another instance, if the identification card includes security features of a full mark rather than a partial mark, the states 1030, 1032, 1034, and 1036 can be removed. In another example, if the identification card does not include the security features of the embossed mark, the states 1040, 1042, 1044, and 1046 can be removed. In some embodiments, states 1002, 1010, 1020, 1030, and 1040 are performed by the detecting device (250), and the rest of the states are performed by the computing device (220).

In state 1002, the identification card authentication system (200) detects an identification card by detecting the rolling of a roller or some other card insertion detection mechanism described above. For the purpose of convenience, FIG. 10 will be described based on the roller being used to detect the identification card insertion. In some embodiments, the identification card includes a top layer, a bottom layer, and one or more intermediate layers positioned vertically between the top layer and the bottom layer. The identification card can be inserted into an identification card insert slot (206) (shown in FIG. 2A), and inserting the identification card can cause the rolling of the roller (382) (shown in FIG. 4A). In some examples, the roller is connected to an encoder (380) that the encoder (380) can detect the rolling. In these examples, once the encoder (380) detects the rolling, the encoder (380) can generate a synchronization signal and transmit the signal to the controller (350). In some cases, the controller (350) can initiate the height detectors (310A and 310B), a full mark detector (320), a partial mark detector (330), and an embossed mark detector (340) to detect their corresponding security features of the identification card (100).

After detecting the identification card, the identification card authentication system (200) can authenticate the identification card by verifying the height, full mark, partial mark, and embossed mark of the identification card. For example, authenticating the height of the identification card is illustrated in states 1010, 1012, 1014, and 1016; authenticating the full mark of the identification card is illustrated in states 1020, 1022, 1024, and 1026; authenticating the partial mark of the identification card is illustrated in states 1030, 1032, 1034, and 1036; and authenticating the embossed mark of the identification card is illustrated in states 1040, 1042, 1044, and 1046. In some examples, the authentication of the identification card can be performed simultaneously by verifying the height, full mark, partial mark, and embossed mark of the identification card. In other examples, the authentication of the identification card can be performed sequentially by verifying the height, full mark, partial mark, and embossed mark of the identification card in any order.

In state 1010, the identification card authentication system (200) detects the height of the identification card. In some examples, the height detectors (310A and 310B) can authenticate the identification card by measuring its height and comparing the measured height and/or number of layers of the identification cards to predetermined authenticity criteria (e.g., the security feature of height and/or number of layers of the identification card). For example, if the authentic identification card (100) is known to have a thickness of approximately 1 mm, the height detectors (310A and 310B) can measure the thickness of the inserted identification card (100) and determine whether it matches the expected or standard 1 mm thickness previously stored. Additionally, these height detectors (310A and 310B) can detect the number of layers forming the identification card (100). If a security feature associated with the card specifies that the card should have four layers, the height detectors (310A and 310B) can determine the number of layers and authenticate the card by confirming that it indeed consists of four layers. In some embodiments, the identification card authentication system (200) may utilize different implementations of height detectors. One such embodiment employs the height detector (310A) to detect the height and/or the number of layers of the identification card (100) by capturing light reflected from the card's side. For instance, a light source can direct illumination toward the side edge of the identification card (100), and a camera integrated within the height detector (310A) can capture the reflected light. In some examples, the camera can include an image sensor, and the image senor can convert the detected reflected light into an electrical signal (e.g., a digital signal) and transmit the electrical signal to the controller (350). By analyzing these optical signals, the height detector (310A) can determine the card's thickness profile and layer configuration. In alternative embodiments, the height detector (310B) can be employed to perform the height or layer measurements using a laser-based approach. In such implementations, the height detector (310B) includes a laser transmitter and a corresponding receiver placed on opposite sides of the identification card (100). When the transmitter emits a laser beam, certain portions of the beam may be blocked or attenuated by the card's layers, and the receiver, positioned opposite to the transmitter, detects the transmitted laser energy. By analyzing the intensity, pattern, and distribution of the received laser beams, the height detector (310B) can ascertain the thickness and the number of layers of the identification card (100). In some examples, the detecting device (250) can transmit the electrical signal to the user computing device (220) via the network (210).

In state 1012, the identification card authentication system (200), by using a controller (350) of the identification card authentication system (200), compares the electrical signals (e.g., having the measured height information of the identification card), with a height of the identification card stored in a memory of the controller (350).

In state 1014, the identification card authentication system (200) verifies whether the measured height is same as the height of the identification card. If the measured height of the identification card is not verified, the authentication fails in state 1016.

In state 1090, if the measured height of the identification card is verified, the identification card is authenticated.

In state 1020, the identification card authentication system (200) detects a full security mark printed on the surface of the top layer of the identification card. In some embodiments, the identification card authentication system (200) includes a full mark detector (320) configured to detect security marks, such as ultraviolet (UV) marks, embedded across substantially the entire surface of the identification card (100). The UV mark may be printed using UV-reactive ink that remains invisible under normal lighting conditions and becomes visible only when exposed to UV light. The full mark detector (320) can include a UV light source to illuminate the identification card's surface. By exposing the identification card (100) to UV light and capturing images of the resulting visible UV patterns, the full mark detector (320) can model the detected mark and verify its authenticity. In some examples, the full light detector (320) can scan the surface (e.g., top layer) of the identification card (100), such that when the identification card is inserted into the identification card insert slot, the full mark detector (320) can scan the surface by detecting the security mark (e.g., the UV mark). In some cases, the full mark detector (320) can include one or more cameras, such that each camera can capture the security mark during the scan (e.g., while inserting the identification card into the identification card insert slot). In some embodiments, the camera can include an image sensor to capture the security mark and convert the captured security mark into electrical signals (e.g., digital signal). In some examples, the detecting device (250) can transmit the electrical signal to the user computing device (220) via the network (210).

In state 1022, the identification card authentication system (200), by using a controller (350) of the identification card authentication system (200), compares the electrical signals (e.g., having the detected full mark information of the identification card), with a full mark (e.g., standard full mark) of the identification card stored in a memory of the controller (350).

In state 1024, the identification card authentication system (200) verifies whether the detected full mark is the same as the full mark of the identification card. If the detected full mark of the identification card is not verified, the authentication failed in state 1026.

In state 1090, if the detected full mark of the identification card is verified, the identification card is authenticated.

In state 1030, the identification card authentication system (200) detects a partial security mark printed on the surface of the top layer of the identification card. In some embodiments, the identification card authentication system (200) includes a partial mark detector (330) configured to detect UV marks located on specific portions of the identification card's surface rather than across its entire area. For example, if a UV mark is embedded only in the top-right corner of the identification card (100), the partial mark detector (330) directs UV light specifically onto that portion. In some embodiments, the partial mark detector (330) includes a light and a camera. For example, the camera can illuminate a light into the portion (e.g., having a partial mark, such as a partial UV mark) of the top layer of the identification card, and the illuminated light is reflected at the partial mark. In some cases, the camera (e.g., an image sensor of the camera) can detect the reflected light and convert the reflected light into electrical signals, having partial mark information. In some examples, the detecting device (250) can transmit the electrical signal to the user computing device (220) via the network (210).

In state 1032, the identification card authentication system (200), by using a controller (350) of the identification card authentication system (200), compares the electrical signals (e.g., having the detected partial mark information of the identification card), with a standard partial mark of the identification card stored in a memory of the controller (350).

In state 1034, the identification card authentication system (200) verifies whether the detected partial mark is the same as the partial mark of the identification card. If the detected partial mark of the identification card is not verified, the authentication is failed in state 1036.

In state 1090, if the detected partial mark of the identification card is verified, the identification card is authenticated.

In state 1040, the identification card authentication system (200) detects an embossed security mark (e.g., printed on the surface of the top layer of the identification card). In some embodiments, the identification card authentication system (200) includes an embossed mark detector (340) configured to authenticate embossed security features. Embossed marks may include raised or indented elements, such as textured patterns or images, which can provide a tactile security feature. In some examples, the embossed mark detector (340) can detect an embossed security mark and include two light sources, a first light source and a second light source. In some examples, each of the first and second light sources can illuminate light to the embossed security mark. The illuminated lights from the first and second light sources can be reflected at the surface of the embossed security mark. In some cases, the embossed mark detector (340) can include a camera to detect the reflected lights, and the camera can include an image sensor to convert the detected reflected lights into electrical signals (e.g., digital signals). In some examples, the detecting device (250) can transmit the electrical signal to the user computing device (220) via the network (210).

In state 1042, the identification card authentication system (200), by using a controller (350) of the identification card authentication system (200), compares the electrical signals (e.g., having the detected embossed mark information of the identification card), with a standard embossed mark of the identification card stored in a memory of the controller (350).

In state 1044, the identification card authentication system (200) verifies whether the detected embossed mark is the same as the embossed mark of the identification card. If the detected embossed mark of the identification card is not verified, the authentication failed in state 1046.

In state 1090, if the detected embossed mark of the identification card is verified, the identification card is authenticated.

Figure 11:
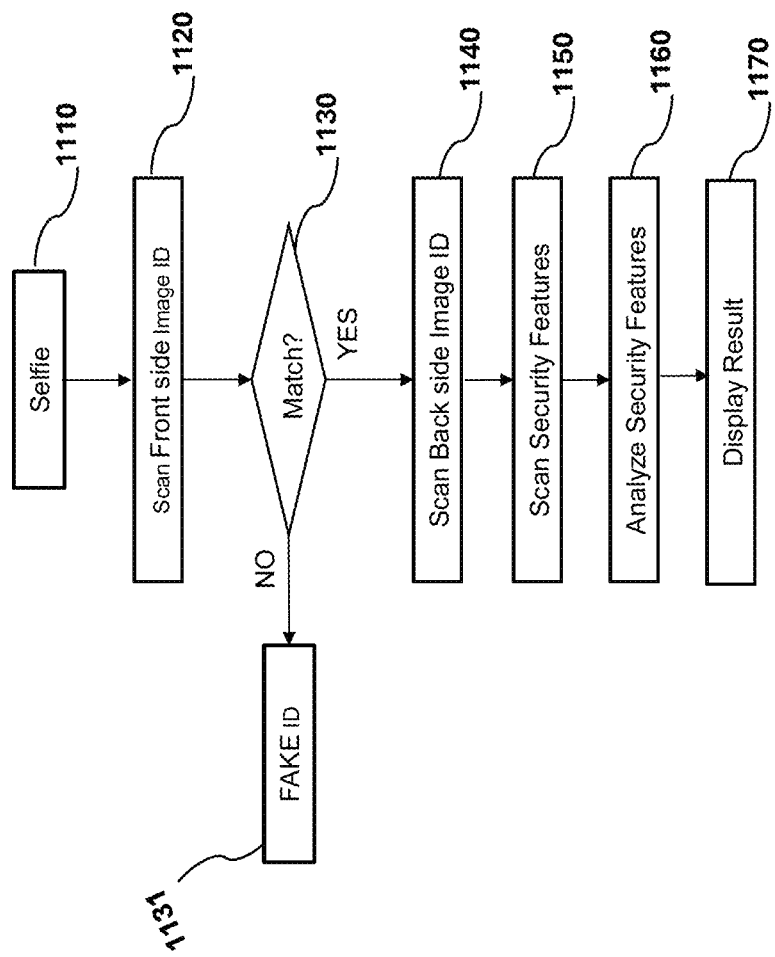
FIG. 11 is a flow diagram depicting an example process implemented by the identification card authentication system in accordance with the present disclosure.

FIG. 11 illustrates an additional example process in accordance with one or more embodiments disclosed herein.

In state 1110, the user takes a face selfie (picture) using the front camera of the computing device (220). For example, the user can take a selfie using a webcam of the computing device (220).

In state 1120, the user scans the front side of the ID card using a rear camera of the computing device (220).

In state 1130, the image captured at state 1110 and the image captured at state 1120 can be compared in the photo area to check for a match. If there is no match, it is recognized as either a counterfeit ID card in state 1131.

In state 1140, the user scans the back of the identification card using the rear camera (226) of the computing device (220). The system recognizes barcodes like PDF-417 and extracts information such as the issuing organization.

In state 1150, when the user inserts the identification card (100) into the detecting device (250), and the detecting device (250) transmits the necessary information to the application.

In state 1160, the application verifies the information received from the detecting device (250) according to the security features of the issuing organization.

In state 1170, the application notifies the user of the authenticity of the identification card (100) and provides the required data (e.g., name, age, address, etc.) for the requesting organization.

It is to be understood that not necessarily all objects or advantages may be achieved in accordance with any particular example described herein. Thus, some examples may be configured to operate in a manner that achieves or optimizes one advantage or group of advantages as taught herein without necessarily achieving other objects or advantages as may be taught or suggested herein.

All of the processes described herein may be embodied in, and fully automated via software code modules, including specific computer-executable instructions, which are executed by a computing system. The computing system may include at least one computer or processor. The code modules may be stored in any type of non-transitory computer-readable medium or other computer storage device. Some or all the methods may be embodied in specialized computer hardware.

Many other variations than those described herein will be apparent from this disclosure. For example, depending on the example, some acts, events, or functions of any of the algorithms described herein can be performed in a different sequence, can be added, merged, or left out altogether (e.g., not all described acts or events are necessary for the practice of the algorithms). Moreover, in some examples, acts or events can be performed concurrently, e.g., through multithreaded processing, interrupt processing, or multiple processors or processor cores or on other parallel architectures, rather than sequentially. In addition, different tasks or processes can be performed by different machines and/or computing systems that can function together.

The various example logical blocks, components and modules described in connection with the examples disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another example, a processor includes an FPGA or other programmable device that performs logic operations without processing computer-executable instructions. A processor can also be implemented as a combination of computing devices, e.g., a combination of a DSP and a microprocessor, a plurality of microprocessors, at least one microprocessor in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that some examples include, while other examples do not include, some features, elements, and/or blocks. Thus, such conditional language is not generally intended to imply that features, elements, and/or blocks are in any way required for any examples or that any example necessarily includes logic for deciding, with or without user input or prompting, whether these features, elements, and/or blocks are included or are to be performed in any particular example.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that some examples require at least one of X, at least one of Y, or at least one of Z to each be present.

Any process descriptions, elements or blocks in the flow diagrams described herein and/or depicted in the attached figures should be understood as potentially representing modules, segments, or portions of code which include executable instructions for implementing specific logical functions or elements in the process. Alternate implementations are included within the scope of the examples described herein in which elements or functions may be deleted, executed out of order from that shown, or discussed, including substantially concurrently or in reverse order, depending on the functionality involved.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A device for detecting security features embedded in an identification card, the identification card comprising a top layer, a bottom layer, and one or more intermediate layers positioned vertically between the top layer and the bottom layer, the device comprising:

an identification card insert slot configured to receive the identification card;

a height detector positioned to face a first side surface of the identification card in response to the identification card being inserted into the identification card insert slot and detect a height of the identification card at the first side surface of the identification card, the first side surface of the identification card including a side of the top layer, a side of the bottom layer, and a side of the one or more intermediate layers, the height detector comprising:

a first light source configured to illuminate light to the first side surface of the identification card inserted into the identification card insert slot and receive a first reflected light reflected from the first side surface of the identification card, and a first camera configured to:

detect the first reflected light, block infrared light in response to detecting the first reflected light, convert the detected first reflected light into one or more first electrical signals representing a detected first height of the identification card at the first side surface of the identification card, and transmit the one or more first electrical signals to a controller of the device;

a full mark detector positioned to face the top layer of the identification card in response to the identification card being inserted into the identification card insert slot, the full mark detector configured to detect a security mark printed on the top layer of the identification card inserted into the identification card insert slot by scanning the top layer of the identification card, the full mark detector comprising:
a sensor configured to scan the top layer of the identification card, the sensor comprising one or more second cameras, each second camera configured to:
capture the security mark on the identification card inserted into the identification card slot,
convert the captured the security mark into one or more second electrical signals representing a detected full security mark of the identification card, and
transmit the one or more second electrical signals to the controller of the device;
a first embossed mark detector positioned to face the top layer of the identification card in response to the identification card being inserted into the identification card insert slot and configured to detect a first embossed security mark on the identification card, the first embossed mark detector comprising:
a second light source and a third light source configured to respectively illuminate second and third lights into the first embossed security mark and receive second reflected lights reflected from a surface of the first embossed security mark, and
a third camera configured to:
detect the second reflected lights,
convert the detected second reflected lights into one or more third electrical signals representing a detected first embossed security mark of the identification card, and
transmit the one or more third electrical signals to the controller of the device;
a network interface communicatively coupled with a computing device; and a controller configured to:
transmit the one or more first electrical signals representing the detected first height of the identification card to the computing device via the network interface,
transmit the one or more second electrical signals representing the detected full security mark of the identification card to the computing device via the network interface, and
transmit the one or more third electrical signals representing the detected first embossed security mark of the identification card to the computing device via the network interface.

2. The device of claim 1, wherein the controller is configured to cause a processor of the computing device to authenticate the identification card by:
comparing the one or more first electrical signals with a standard height of the identification card stored in a memory of the computing device,
comparing the one or more second electrical signals with a standard security mark of the identification card stored in the memory of the computing device, and
comparing the one or more third electrical signals with a standard first embossed mark of the identification card stored in the memory of the computing device.

3. The device of claim 1, further comprising a roller positioned to face and configured to contact the top layer or the bottom layer of the identification card, the roller configured to roll in response to the identification card insert slot receiving the identification card.

4. The device of claim 3, further comprising an encoder operatively coupled with the roller, the encoder configured to:
detect the rolling of the roller,
in response to detecting the rolling of the roller, generate a synchronization signal, indicating that the identification card is inserted into the identification card insert slot, and
transmit the synchronization signal to the controller, and the controller further configured to, in response to receiving the synchronization signal, activate the height detector, the full mark detector, and the first embossed mark detector.

5. The device of claim 1, wherein the first camera is further configured to detect colors of each layer of the top layer, the one or more intermediate layers, and the bottom layer of the identification card.

6. A device for detecting security features embedded in an identification card, the identification card comprising a top layer, a bottom layer, and one or more intermediate layers positioned vertically between the top layer and the bottom layer, the device comprising:
an identification card insert slot configured to receive the identification card;
a height detector positioned to face a first side surface of the identification card in response to the identification card being inserted into the identification card insert slot and detect a height of the identification card at the first side surface of the identification card, the first side surface of the identification card including a side of the top layer, a side of the bottom layer, and a side of the one or more intermediate layers, the height detector comprising:
a first light source configured to illuminate light to the first side surface of the identification card inserted into the identification card insert slot and receive a first reflected light reflected from the first side surface of the identification card, and
a first camera configured to:
detect the first reflected light,
convert the detected first reflected light into one or more first electrical signals representing a detected first height of the identification card at the first side surface of the identification card, and
transmit the one or more first electrical signals to a controller of the device;
a full mark detector positioned to face the top layer of the identification card in response to the identification card being inserted into the identification card insert slot, the full mark detector configured to detect a security mark printed on the top layer of the identification card inserted into the identification card insert slot by scanning the top layer of the identification card, the full mark detector comprising:
a sensor configured to scan the top layer of the identification card, the sensor comprising one or more second cameras, each second camera configured to:
capture the security mark on the identification card inserted into the identification card slot,
convert the captured the security mark into one or more second electrical signals representing a detected full security mark of the identification card, and
transmit the one or more second electrical signals to the controller of the device;
a first embossed mark detector positioned to face the top layer of the identification card in response to the identification card being inserted into the identification card insert slot and configured to detect a first embossed security mark on the identification card, the first embossed mark detector comprising:
  a second light source and a third light source configured to respectively illuminate second and third lights into the first embossed security mark and receive second reflected lights reflected from a surface of the first embossed security mark, and
  a third camera configured to:
    detect the second reflected lights,
    convert the detected second reflected lights into one or more third electrical signals representing a detected first embossed security mark of the identification card, and
    transmit the one or more third electrical signals to the controller of the device;
a network interface communicatively coupled with a computing device; and a controller configured to:
  transmit the one or more first electrical signals representing the detected first height of the identification card to the computing device via the network interface,
  transmit the one or more second electrical signals representing the detected full security mark of the identification card to the computing device via the network interface, and
  transmit the one or more third electrical signals representing the detected first embossed security mark of the identification card to the computing device via the network interface,
wherein the sensor included in the full mark detector has a resolution of at least 300 dots per inch.

7. The device of claim 1, further comprising a second embossed mark detector positioned to face the bottom layer of the identification card and configured to detect a second embossed security mark embedded on a surface of the bottom layer of the identification card in response to the identification card being inserted into the identification card insert slot and, the second embossed mark detector comprising:
  a fourth light source and a fifth light source configured to respectively illuminate fourth and fifth lights into the second embossed security mark and receive third reflected lights reflected from the surface of the second embossed security mark, and
  a fourth camera configured to:
    detect the third reflected lights,
    convert the detected third reflected lights into one or more fourth electrical signals representing the detected second embossed security mark of the identification card, and
    transmit the one or more fourth electrical signals to the controller of the device.

8. The device of claim 1, further comprising a rechargeable battery configured to supply power to the height detector, the full mark detector, the first embossed mark detector, and the controller, the rechargeable battery comprising a receiving coil configured to receive wireless charging energy from an external wireless charger, the external wireless charger electromagnetically coupled with a receiving coil of the rechargeable battery and configured to wirelessly transmit the wireless charging energy to the receiving coil.

9. The device of claim 1, further comprising a partial mark detector positioned to face the bottom layer of the identification card and configured to detect a partial security mark printed on a surface of the bottom layer of the identification card in response to the identification card being inserted into the identification card insert slot, the partial mark detector comprising:
  a sixth light source configured to illuminate light to the partial security mark included on the surface of the bottom layer of the identification card inserted into the identification card insert slot and receive a fifth reflected light reflected from the partial security mark of the identification card, and
  a fifth camera configured to:
    detect the fifth reflected light,
    convert the detected fifth reflected light into one or more fifth electrical signals representing a detected partial security mark of the identification card, and
    transmit the one or more fifth electrical signals to the controller of the device.

10. The device of claim 1, wherein the second light source and the third light source are positioned to illuminate the second and the third lights, respectively, into the embossed security mark, and wherein the second light source and the third light source are positioned at a same vertical position with a different horizontal distance from the third camera.

11. The device of claim 1, wherein the controller is further configured to simultaneously activate the height detector, the full mark detector, and the embossed mark detector to simultaneously detect the height, the full security mark, and the embossed security mark, respectively.

12. The device of claim 1, wherein the controller is further configured to sequentially activate, in any order of, the height detector, the full mark detector, and the embossed mark detector.

13. The device of claim 1, wherein the height detector is positioned to face a second side surface of the identification card, the second side of the identification card including the first side surface of the identification card and a raised portion on the surface of the top layer of the first side surface of the identification card, the first light source further configured to:
  illuminate light to the second side surface of the identification card, and
  receive a sixth reflected light reflected from the second side surface of the identification card,
  the camera further configured to:
    detect the sixth reflected light,
    convert the detected sixth reflected light into one or more sixth electrical signals representing a detected second height of the identification card at the second side surface of the identification card, and
    transmit the one or more sixth electrical signals to the controller of the device.

14. The device of claim 1, wherein at least one of the one or more third electrical signals represents a diffraction pattern of the second reflected lights.

15. The device of claim 1, wherein the one or more second cameras are further configured to detect an ultraviolet pattern included in the full security mark.

16. The device of claim 1, wherein each layer of the identification card comprises different colors from each other.

17. The device of claim 16, wherein the first camera is further configured to:
  detect a color of each layer of the identification card,
  convert each detected color of each layer of the identification card into one or more seventh electrical signals representing each color of each layer of the identification card, and transmit the one or more seventh electrical signals to the controller of the device.

18. The device of claim 1, further comprising a radio frequency identification (RFID) chip reader configured to wirelessly access data encoded in an RFID chip embedded in the identification card.

19. A device for detecting security features embedded in an identification card, the identification card comprising a top layer, a bottom layer, and one or more intermediate layers positioned vertically between the top layer and the bottom layer, the device comprising:

an identification card insert slot configured to receive the identification card;

a height detector positioned to face a first side surface of the identification card in response to the identification card being inserted into the identification card insert slot and detect a height of the identification card at the first side surface of the identification card, the first side surface of the identification card including a side of the top layer, a side of the bottom layer, and a side of the one or more intermediate layers, the height detector comprising:
  a first light source configured to illuminate light to the first side surface of the identification card inserted into the identification card insert slot and receive a first reflected light reflected from the first side surface of the identification card, and
  a first camera configured to:
    detect the first reflected light,
    convert the detected first reflected light into one or more first electrical signals representing a detected first height of the identification card at the first side surface of the identification card, and
    transmit the one or more first electrical signals to a controller of the device;

a full mark detector positioned to face the top layer of the identification card in response to the identification card being inserted into the identification card insert slot, the full mark detector configured to detect a security mark printed on the top layer of the identification card inserted into the identification card insert slot by scanning the top layer of the identification card, the full mark detector comprising:
  a sensor configured to scan the top layer of the identification card, the sensor comprising one or more second cameras, each second camera configured to:
    capture the security mark on the identification card inserted into the identification card slot,
    convert the captured the security mark into one or more second electrical signals representing a detected full security mark of the identification card, and
    transmit the one or more second electrical signals to the controller of the device;

a first embossed mark detector positioned to face the top layer of the identification card in response to the identification card being inserted into the identification card insert slot and configured to detect a first embossed security mark on the identification card, the first embossed mark detector comprising:
  a second light source and a third light source configured to respectively illuminate second and third lights into the first embossed security mark and receive second reflected lights reflected from a surface of the first embossed security mark, and
  a third camera configured to:
    detect the second reflected lights,
    convert the detected second reflected lights into one or more third electrical signals representing a detected first embossed security mark of the identification card, and
    transmit the one or more third electrical signals to the controller of the device;

a network interface communicatively coupled with a computing device; and a controller configured to:
  transmit the one or more first electrical signals representing the detected first height of the identification card to the computing device via the network interface,
  transmit the one or more second electrical signals representing the detected full security mark of the identification card to the computing device via the network interface, and
  transmit the one or more third electrical signals representing the detected first embossed security mark of the identification card to the computing device via the network interface, wherein at least one of the one or more second cameras is configured to measure a color density included in a portion of the full security mark.

* * * * *